US012591745B2

(12) United States Patent
Korbak et al.

(10) Patent No.:  US 12,591,745 B2
(45) Date of Patent:  Mar. 31, 2026

(54) METHOD AND SYSTEM FOR FINE-TUNING NEURAL CONDITIONAL LANGUAGE MODELS USING CONSTRAINTS

(71) Applicant: NAVER CORPORATION, Seongnam-si (KR)

(72) Inventors: Tomasz Korbak, Warsaw (PL); Hady Elsahar, Grenoble (FR); German Kruszewski, Saint Mandé (FR); Marc Dymetman, Grenoble (FR)

(73) Assignee: NAVER CORPORATION, Seongnam-si (KR)

( * ) Notice: Subject to any disclaimer, the term of this patent is extended or adjusted under 35 U.S.C. 154(b) by 610 days.

(21) Appl. No.: 17/937,629

(22) Filed: Oct. 3, 2022

(65)  Prior Publication Data

US 2024/0054338 A1   Feb. 15, 2024

Related U.S. Application Data

(60) Provisional application No. 63/369,576, filed on Jul. 27, 2022.

(51) Int. Cl.
| | |
|---|---|
| *G06F 40/30* | (2020.01) |
| *G06F 40/166* | (2020.01) |
| *G06F 40/47* | (2020.01) |
| *G06N 3/08* | (2023.01) |

(52) U.S. Cl.
CPC ............ *G06F 40/30* (2020.01); *G06F 40/166* (2020.01); *G06F 40/47* (2020.01); *G06N 3/08* (2013.01)

(58) Field of Classification Search
None
See application file for complete search history.

(56) References Cited

U.S. PATENT DOCUMENTS

| | | | |
|---|---|---|---|
| 2021/0357187 A1* | 11/2021 | Clement ................... | G06F 8/35 |
| 2022/0083852 A1* | 3/2022 | Parshakova ............. | G06N 3/08 |
| 2022/0108081 A1* | 4/2022 | Dymetman ............. | G06F 40/30 |
| 2022/0261555 A1* | 8/2022 | Lebanoff ................ | G06F 40/40 |

FOREIGN PATENT DOCUMENTS

EP        3979121 A1     4/2022

OTHER PUBLICATIONS

Alnajjar, K., "When Word Embeddings Become Endangered," Multilingual Facilitation, University of Helsinki, Mar. 2021, pp. 275-288 published on arXiv:2103.13275v1, Mar. 24, 2021, 14 pages.

(Continued)

*Primary Examiner* — Antim G Shah
(74) *Attorney, Agent, or Firm* — Greer, Burns & Crain, Ltd.

(57)  ABSTRACT

A processor-implemented method for fine-tuning a pre-trained neural conditional language model to perform a downstream task. A pre-trained conditional language model and at least one target constraint for satisfying a task-related control objective are received. A neural model is trained to approximate a target conditional model that optimally reconciles a distance from the pre-trained conditional language model and the control objective across multiple contexts.

32 Claims, 16 Drawing Sheets

(56) References Cited

OTHER PUBLICATIONS

Austin, J., et al., "Program Synthesis with Large Language Models," published on arXiv, as 210807732, Aug. 16, 2021, 34 pages.

Bielik, P., et al., "PHOG: Probabilistic Model for Code," ICML'16, JMLR.org, 2016, pp. 2933-2942.

Black, S., et al., "GPT-Neo: Large Scale Autoregressive Language Modeling with Mesh-Tensoflow," Tensorflow (1.0), Zenodo, Mar. 21, 2021, 4 pages.

Bommasani, R., et al. "On the Opportunities and Risks of Foundation Models," published on arXiv as 210807258, Jul. 12, 2022, 214 pages.

Brown, T., et al., "Language Models Are Few-Shot Learners," published on arXiv as 200214165, Jul. 22, 2020, 75 pages.

Chen, M., et al., "Evaluating Large Language Models Trained on Code," published on arXiv as 210703374, Jul. 14, 2021, 35 pages.

Csiszar, I., et al., "Information Theory and Statistics: A Tutorial," Foundations and Trends™ in Communications and Information Theory, 2004, pp. 417-528.

Dathathri, S., et al., "Plug and play language models: A simple approach to controlled text generation," ICLR 2020, Addis Ababa, Ethiopia, Apr. 26-30, 2020, 34 pages.

Devlin, J., et al., "Bert: Pre-Training of Deep Bidirectional Transformers for Language Understanding," Proceedings of NAACL-HLT 2019, Minneapolis, Minnesota, Jun. 2-7, 2019, pp. 4171-4186.

Falke, T. et al., "Ranking Generated Summaries by Correctness: An Interesting but Challenging Application for Natural Language Inference," Proceedings of the 57th Annual Meeting of the Association for Computational Linguistics, Florence, Italy: Association for Computational Linguistics, Aug. 2, 2019, pp. 2214-2220.

Gao, L., et al., "The Pile: An 800GB Dataset of Diverse Text for Language Modeling," published on arXiv as 202100027, Dec. 31, 2020, 39 pages.

Ghazvininejad, M., et al., "Hafez: An Interactive Poetry Generation System," Proceedings of ACL 2017, System Demonstrations, Vancouver, Canada: Association for Computational Linguistics, 2017, pp. 43-48.

Hinton, G., "Training Products of Experts by Minimizing Contrastive Divergence," Neural Computation 14, No. 8, Aug. 1, 2002, pp. 1771-1800.

Holtzman, A., et al., "Learning to Write with Cooperative Discriminators," Proceedings of the 56th Annual Meeting of the Association for Computational Linguistics, Melbourne, Australia, Jul. 15-20, 2018, pp. 1638-1649.

Holtzman, A., et al., "The Curious Case of Neural Text Degeneration," 8th International Conference on Learning Representations, ICLR 2020, Addis Ababa, Ethiopia, Apr. 26-30, 2020, 16 pages.

Karpathy, A., "Visualizing and Understanding Recurrent Networks," published on arXiv as 150602078, Nov. 16, 2015.

Khalifa, M., et al., "A Distributional Approach to Controlled Text Generation," International Conference on Learning Representations, 2021, 69 pages.

Kingma, D., et al., "Adam: A Method for Stochastic Optimization," Published as a conference paper at International Conference on Learning Representations, 2015, 15 pages.

Koehn, P., "A parallel corpus for statistical machine translation," Proceedings of Machine Translation Summit X: Papers, Phuket, Thailand, Sep. 13-15, 2005, pp. 79-86.

Korbak, T., et al., "Energy-Based Models for Code Generation under Compilability Constraints," published on arXiv as 210604985, Jun. 9, 2021, 18 pages.

Li, J., et al., "A Diversity-Promoting Objective Function for Neural Conversation Models," Proceedings of the 2016 Conference of the North American Chapter of the Association for Computational Linguistics: Human Language Technologies, San Diego, California, Jun. 12-17, 2016, pp. 110-119.

Lin, C., Rouge: A Package for Automatic Evaluation of Summaries, Text Summarization Branches Out, Association for Computational Linguistics, Barcelona, Spain, Jul. 2004, pp. 74-81.

Lu, S., et al. "CodeXGlue: A Machine Learning Benchmark Dataset for Code Understanding and Generation," published on arXiv as 210204664, Mar. 16, 2021, 14 pages.

Maddison, C. et al., "Structured Generative Models of Natural Source Code," Proceedings of the 31st International Conference on International Conference on Machine Learning, vol. 32, ICML'14, 2014, pp. II-649-II-657.

Maynez, J., et al., "On Faithfulness and Factuality in Abstractive Summarization," Proceedings of the 58th Annual Meeting of the Association for Computational Linguistics, Association for Computational Linguistics, Jul. 5-10, 2020, pp. 1906-1919.

Nallapati, R., et al., "Abstractive Text Summarization Using Sequence-to-Sequence RNNs and Beyond," Proceedings of the 20th SIGNLL Conference on Computational Natural Language Learning, Berlin, Germany: Association for Computational Linguistics, Aug. 7-12, 2016, pp. 280-290.

Nan, F., et al., "Entity-Level Factual Consistency of Abstractive Text Summarization," Proceedings of the 16th Conference of the European Chapter of the Association for Computational Linguistics: Main vol. Association for Computational Linguistics, Apr. 19-23, 2021, pp. 2727-2733.

Nguyen, T., et al., "A Statistical Semantic Language Model for Source Code," Proceedings of the 2013 9th Joint Meeting on Foundations of Software Engineering, Saint Petersburg Russia: ACM, Aug. 18-26, 2013, pp. 532-542.

Parshakova, T., et al., "Distributional Reinforcement Learning for Energy-Based Sequential Models," published on arXiv as 191208517, Dec. 18, 2019, 17 pages.

Parshakova, T., et al., "Global Autoregressive Models for Data-Efficient Sequence Learning," Proceedings of the 23rd Conference on Computational Natural Language Learning (CoNLL), Hong Kong, China: Association for Computational Linguistics, Nov. 3-4, 2019, pp. 900-909.

Pasunuru, R., et al., "Multi-Reward Reinforced Summarization with Saliency and Entailment," Proceedings of the 2018 Conference of the North American Chapter of the Association for Computational Linguistics: Human Language Technologies, New Orleans, Louisiana, Jun. 1-6, 2018, pp. 646-653.

Paszke, A., et al., "Pytorch: An imperative style, high-performance deep learning library," 33rd Conference on Neural Information Processing Systems, Vancouver, Canada, 2019, 12 pages.

Radford, A., et al., "Learning Transferable Visual Models From Natural Language Supervision," Proceedings of the 38th International Conference on Machine Learning, 2021, 16 pages.

Radford, A., et al., "Language Models Are Unsupervised Multitask Learners," OpenAI Blog, 1(8):9, 2019, 24 pages.

Raffel, C., et al., "Exploring the Limits of Transfer Learning with a Unified Text-to-Text Transformer," Journal of Machine Learning Research 21, No. 140, 2020, pp. 1-67.

Raychev, V., et al., "Probabilistic Model for Code with Decision Trees," Proceedings of the 2016 ACM SIGPLAN International Conference on Object-Oriented Programming, Systems, Languages, and Applications, Amsterdam Netherlands: ACM, Nov. 2-4, 2016, pp. 731-747.

Raychev, V., et al., "Code Completion with Statistical Language Models," Proceedings of the 35th ACM SIGPLAN Conference on Programming Language Design and Implementation, Edinburgh United Kingdom: ACM, Jun. 9-11, 2014, pp. 419-428.

Roziere, B., et al., "Unsupervised Translation of Programming Languages," 34th Conference on Neural Information Processing Systems Vancouver, Canada, 2020, 11 pages.

See, A., et al., "What Makes a Good Conversation? How Controllable Attributes Affect Human Judgments," Proceedings of the 2019 Conference of the North, Minneapolis, Minnesota: Association for Computational Linguistics, Jun. 2-7, 2019, pp. 1702-1723.

Sutton, R., et al., "Policy Gradient Methods for Reinforcement Learning with Function Approximation," Advances in Neural Information Processing Systems 12, MIT Press, 2000, pp. 1057-1063.

Von Rossum, G., et al., "PEP 8—Style Guide for Python Code," Python Enhanacement Proposals, PEP Index, 2001, Retrieved from the Internet: https://github.com/python/peps/blob/main/peps/pep-0008.rst, 37 pages.

(56) References Cited

OTHER PUBLICATIONS

Williams, R., "Simple Statistical Gradient-Following Algorithms for Connectionist Reinforcement Learning," Machine Learning 8, 1992, pp. 229-256.

Wolf, T., et al., "HuggingFace's Transformers: State-of-the-Art Natural Language Processing," published on arXiv as 191003771, Jul. 14, 2020, 8 pages.

Zhong, V., et al., "Seq2SQL: Generating Structured Queries from Natural Language Using Reinforcement Learning," Published on arXiv as 170900130, Nov. 9, 2017, 12 pages.

Ziegler, D., et al., "Fine-Tuning Language Models from Human Preferences," published on arXiv as 190908593, Sep. 18, 2019, 26 pages.

Montani, I., et al., "explosion/spaCy: v3.4.1: Fix compatibility with CuPy v9.x," explosion/spaCy: v2.3.5: Bug fixes and simpler source installs (v2.3.5). Zenodo, Jul. 26, 2022, 4 pages.

Montani, I., et al., "explosion/spaCy: v2.3.5: Bug fixes and simpler source installs," explosion/spaCy: v2.3.5: Bug fixes and simpler source installs (v2.3.5). Zenodo, Dec. 11, 2020, 4 pages.

* cited by examiner

200

Receive pre-trained conditional language model — 202

Receive target constraint — 204

Train a neural model (reference policy) to approximate a target conditional model Sample N contexts — 210

Compute unconditional EBM for each context — 212

Update neural model over N contexts by importance sampling using M samples — 214

206

Output trained neural model — 208

Step 1: Sample a context c

Two cats are sitting on a mat

Step 2: Define a target distribution for context c

(a) probabilities given by the original model

| | |
|---|---|
| Deux chats sont assis sur un tapis | 0.20 |
| Deux chats s'assoient sur une natte | 0.10 |
| 2 chats sont assis sur un tapis | 0.002 |
| 2 chats s'assoient sur une natte | 0.001 |

(b) constraint satisfaction scores

| | |
|---|---|
| Deux chats sont assis sur un tapis | 0 |
| Deux chats s'assoient sur une natte | 0 |
| 2 chats sont assis sur un tapis | 1 |
| 2 chats s'assoient sur une natte | 1 |

(a+b) probabilities given by the target distribution

| | |
|---|---|
| Deux chats sont assis sur un tapis | 0 |
| Deux chats s'assoient sur une natte | 0 |
| 2 chats sont assis sur un tapis | 0.40 |
| 2 chats s'assoient sur une natte | 0.20 |

Step 3: Update current model to approximate the target distribution when conditioned on c

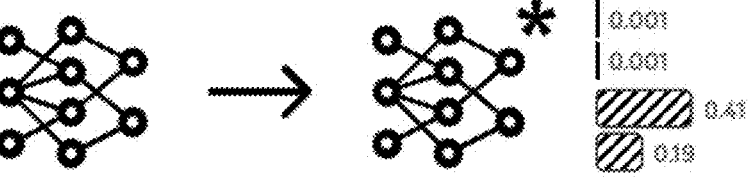

| | |
|---|---|
| | 0.001 |
| | 0.001 |
| | 0.41 |
| | 0.19 |

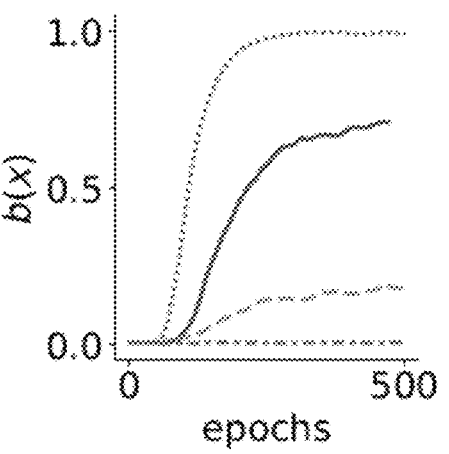
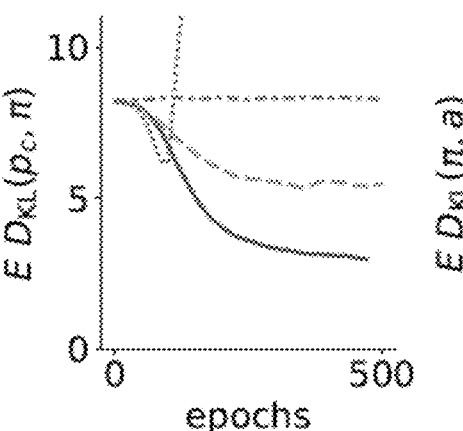
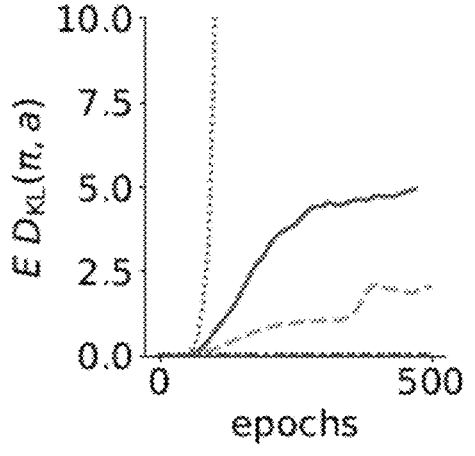
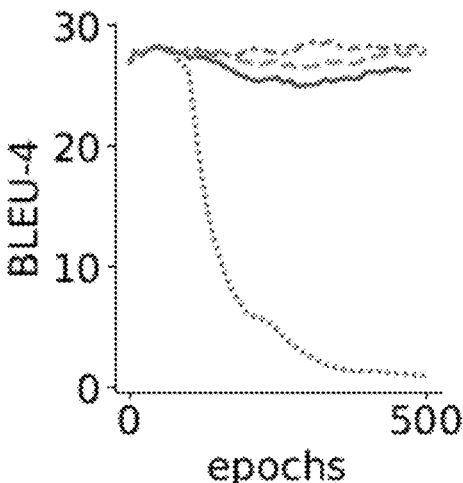
CDPG
DPG
Reinforce
Ziegler
FIG. 5

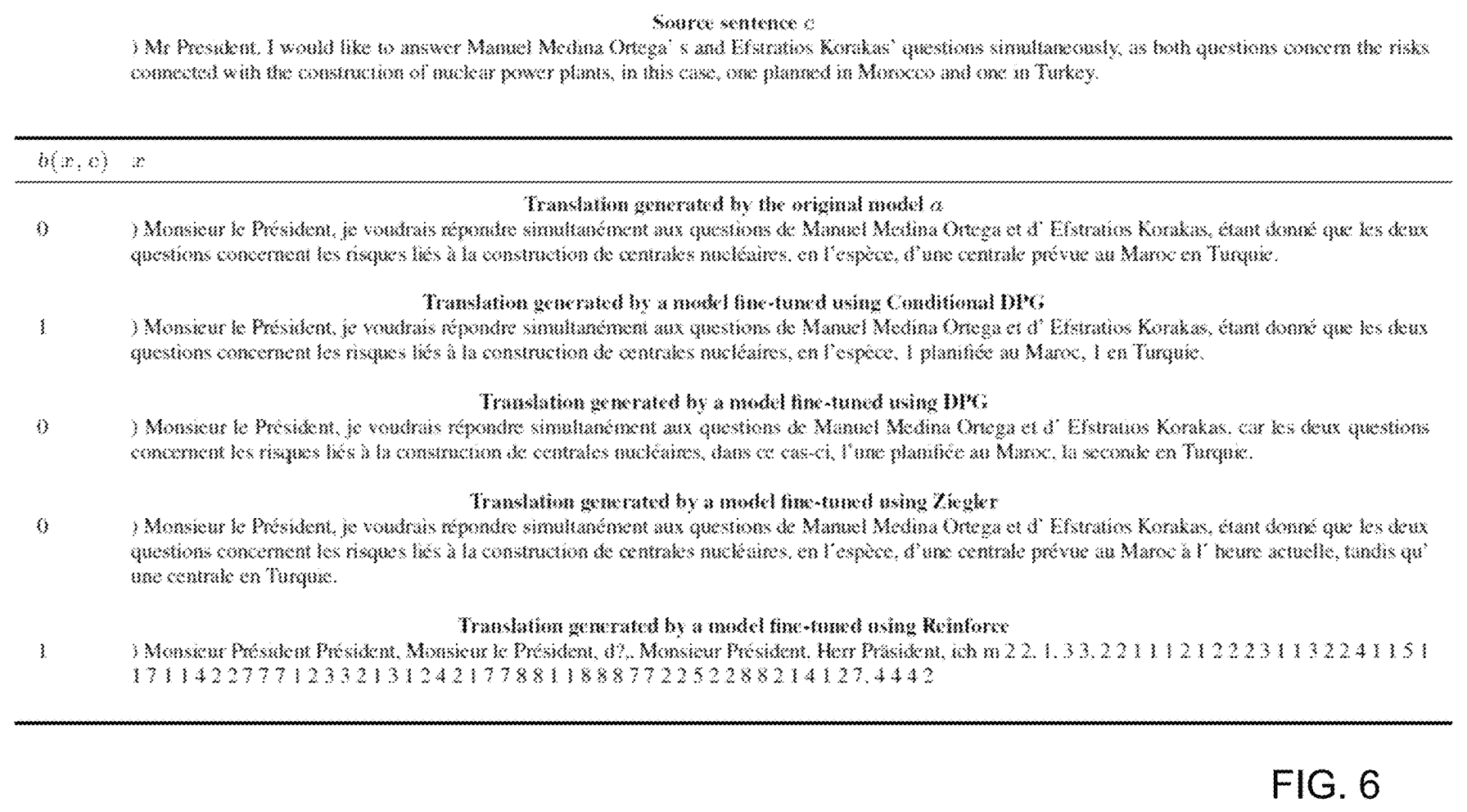

Source sentence c

) Mr President, I would like to answer Manuel Medina Ortega's and Efstratios Korakas' questions simultaneously, as both questions concern the risks connected with the construction of nuclear power plants, in this case, one planned in Morocco and one in Turkey.

$h(x,c)$    $x$

Translation generated by the original model $\alpha$

0 ) Monsieur le Président, je voudrais répondre simultanément aux questions de Manuel Medina Ortega et d' Efstratios Korakas, étant donné que les deux questions concernent les risques liés à la construction de centrales nucléaires, en l'espèce, d'une centrale prévue au Maroc en Turquie.

Translation generated by a model fine-tuned using Conditional DPG

1 ) Monsieur le Président, je voudrais répondre simultanément aux questions de Manuel Medina Ortega et d' Efstratios Korakas, étant donné que les deux questions concernent les risques liés à la construction de centrales nucléaires, en l'espèce, 1 planifiée au Maroc, 1 en Turquie.

Translation generated by a model fine-tuned using DPG

0 ) Monsieur le Président, je voudrais répondre simultanément aux questions de Manuel Medina Ortega et d' Efstratios Korakas, car les deux questions concernent les risques liés à la construction de centrales nucléaires, dans ce cas-ci, l'une planifiée au Maroc, la seconde en Turquie.

Translation generated by a model fine-tuned using Ziegler

0 ) Monsieur le Président, je voudrais répondre simultanément aux questions de Manuel Medina Ortega et d' Efstratios Korakas, étant donné que les deux questions concernent les risques liés à la construction de centrales nucléaires, en l'espèce, d'une centrale prévue au Maroc à l'heure actuelle, tandis qu' une centrale en Turquie.

Translation generated by a model fine-tuned using Reinforce

1 ) Monsieur Président Président, Monsieur le Président, d?.. Monsieur le Président. Herr Präsident, ich m 2.2.1.3.3.2.2.1.1.2.1.2.2.2.3.1.1.3.2.2.4.1.3.5.1 1.7.1.1.4.2.2.7.7.7.1.2.3.3.2.1.3.1.2.4.2.1.7.7.8.8.1.1.8.8.8.7.7.2.2.5.2.2.8.8.2.1.4.1.2.7.4.4.4.2

FIG. 6

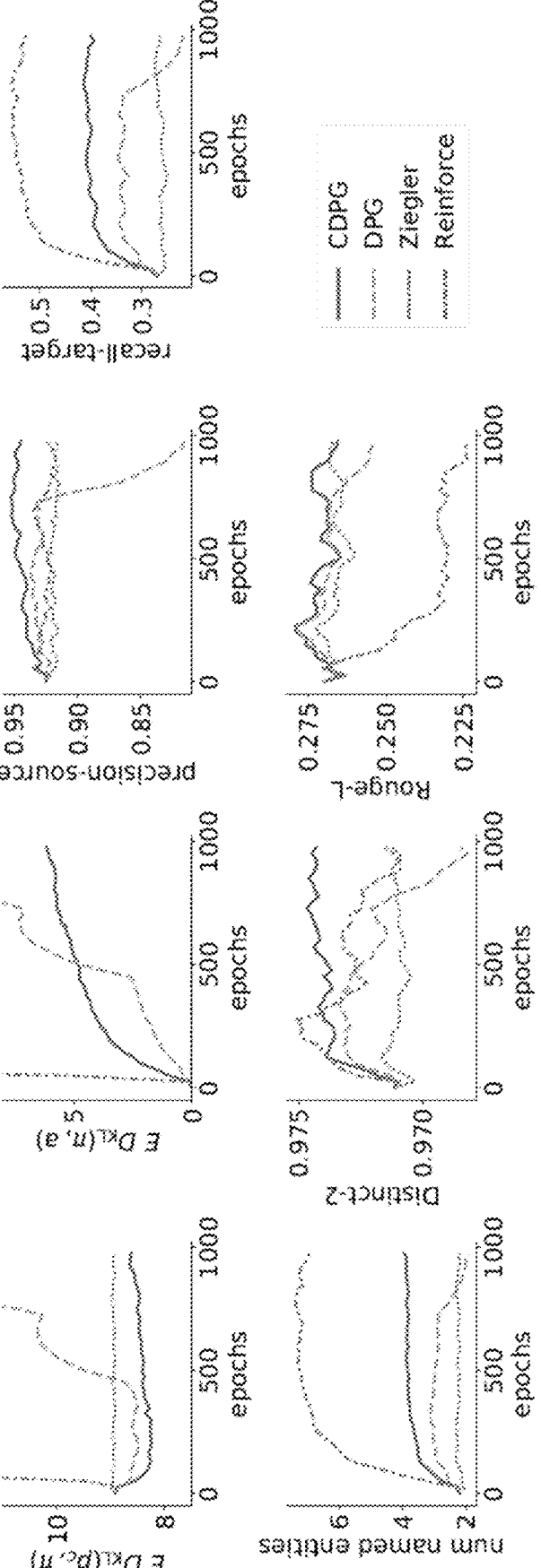
FIG. 7

Source document $c$ (CNN) "Success Kid" is likely the Internet's most famous baby. You've seen him in dozens of memes, fist clenched in a determined look of persevering despite the odds. Success Kid – now an 8-year-old named Sammy Griner – needs a kidney transplant. His dad, Justin, needs a kidney transplant. About a week ago, Laney Griner, Justin's wife and Sammy's mother, created a GoFundMe campaign with a goal of $75,000 to help cover the medical expenses that go along with a kidney transplant. The campaign is already a success. By Wednesday it had topped its goal. Griner told The Daily Dot that her husband was diagnosed with kidney disease in 2006 and suffered complete kidney failure three years later. "One can only survive with no natural kidney function ... for so long," Laney Griner said. "His energy and mood are affected; he can no longer work, and he spends 12 hours a week in dialysis clinic. "Having been on dialysis for this long greatly increases his risks of developing further complications. The only way to save his life is to get a transplant. There's no other way around that," she said. The family doesn't know when a kidney might become available. Their GoFundMe page has a link for potential donors. Sammy's Internet fame began in 2007 when his mom posted a picture of him on a beach with a fist full of sand and a satisfied look on his face. Myspace picked it up, so did Reddit. The rest is Internet history. Success just seems to run in some families.

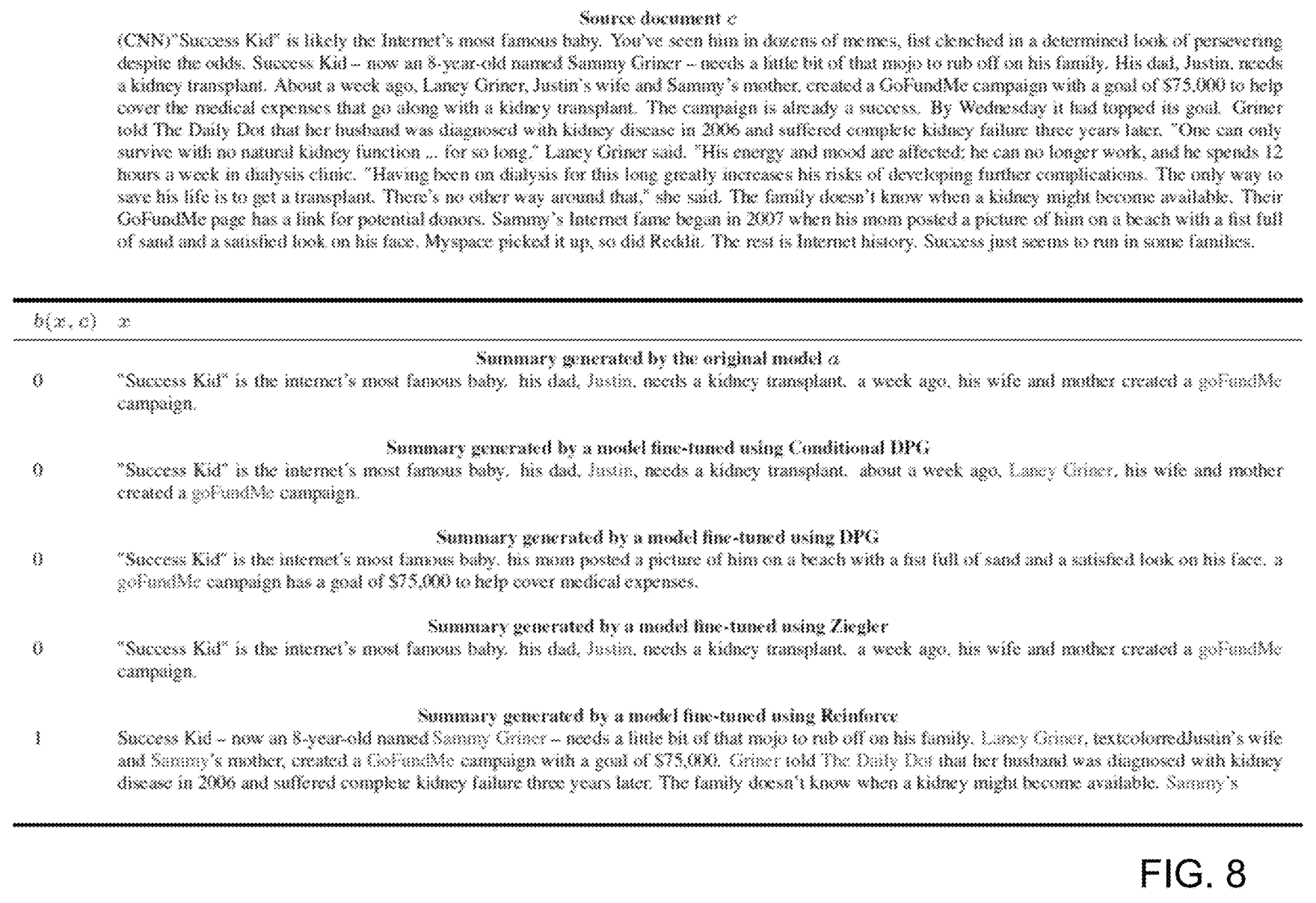

$b(x, c)$    $x$

Summary generated by the original model $a$

0    "Success Kid" is the internet's most famous baby, his dad, Justin, needs a kidney transplant, a week ago, his wife and mother created a goFundMe campaign.

Summary generated by a model fine-tuned using Conditional DPG

0    "Success Kid" is the internet's most famous baby, his dad, Justin, needs a kidney transplant, about a week ago, his wife and mother created a goFundMe campaign.

Summary generated by a model fine-tuned using DPG

0    "Success Kid" is the internet's most famous baby, his mom posted a picture of him on a beach with a fist full of sand and a satisfied look on his face. a goFundMe campaign has a goal of $75,000 to help cover medical expenses.

Summary generated by a model fine-tuned using Ziegler

0    "Success Kid" is the internet's most famous baby, his dad, Justin, needs a kidney transplant, a week ago, his wife and mother created a goFundMe campaign.

Summary generated by a model fine-tuned using Reinforce

1    Success Kid – now an 8-year-old named Sammy Griner – needs a little bit of that mojo to rub off on his family. Laney Griner, text:colored:Justin's wife and Sammy's mother, created a GoFundMe campaign with a goal of $75,000. Griner told The Daily Dot that her husband was diagnosed with kidney disease in 2006 and suffered complete kidney failure three years later. The family doesn't know when a kidney might become available. Sammy's

FIG. 8

Sequences sampled from the original model α

Sequences sampled from a model fine-tuned using Conditional DPO

*Sequences sampled from a model fine-tuned using Ziegler*

```
def __init__(self):
    self.headers_headers_headers_headers_headers_headers_headers_headers_headers_headers_ def __init__(self):
    self.shape_children_children_children_children_children_children_children_ def __init__(self):
    self.items_items_items_items_items_items_items_items_items_items_items_items_
```

*Sequences sampled from a model fine-tuned using Reinforce*

```
def __init__(self):
    self.screen = screen def __init__(self):
    self.value = None
    self.shadow = None
    self.showTitles()
    self.context = None def __init__(self):
    self.description = ''
    self.title = ''
```

FIG. 11B (a) Translation with terminology constraint (b) Summarization with factual consistency constraint (c) Code generation with compilability constraint (d) Code generation with PEP8 constraint

METHOD AND SYSTEM FOR FINE-TUNING NEURAL CONDITIONAL LANGUAGE MODELS USING CONSTRAINTS

PRIORITY INFORMATION

This application claims priority to and benefit from U.S. Provisional Patent Application Ser. No. 63/369,576, filed Jul. 27, 2022, which application is incorporated in its entirety by reference herein.

FIELD

The present disclosure relates generally to machine learning, and more particularly to neural language processing.

BACKGROUND

General-purpose pretrained generative models can be trained in a self-supervised manner on large amounts of data and can then be applied to solve various downstream tasks. However, due to their generic training methodology, such models often fail to meet one or more downstream requirements (e.g., hallucinations in abstractive summarization, style violations in code generation, etc.). It would be useful to adapt pretrained generative models to meet requirements without destroying their general capabilities, which is referred to as catastrophic forgetting.

U.S. patent application Ser. No. 17/391,178, filed Aug. 2, 2021, which is incorporated herein by reference, discloses adapting pretrained generative models by representing task-specific requirements or constraints through so-called energy-based models (EBMs) and approximating these EBMs using distributional policy gradients (DPGs).

Language models are most useful when they are conditioned on some input, or context, to solve tasks, such as summarization, code generation, translation, dialogue, etc. Adapting language models to follow given constraints related to such conditional tasks can also lead to catastrophic forgetting. For instance, the fine-tuned model may become better at following the constraints at the expense of forgetting everything else. As another example, fine-tuning may require labeled (ground truth) data, which may not be available. The models and distributions disclosed in the '178 Application are unconditional, and thus may not be suitable for fine-tuning conditional language models to perform such tasks with task-related constraints.

SUMMARY

Provided herein, among other things, are methods implemented by a processor for fine-tuning a pre-trained neural conditional language model to perform a downstream task. A pre-trained conditional language model having attributes with existing probability distributions conditioned on contexts, and at least one target constraint for satisfying a task-related control objective, are received. The target constraint specifies an expectation of a target attribute. A neural model is trained to approximate a target conditional model that optimally reconciles a distance from the pre-trained conditional language model and the control objective across multiple contexts.

According to a complementary aspect, the present disclosure provides a computer program product, comprising code instructions to execute a method according to the previously described aspects; and a computer-readable medium, on which is stored a computer program product comprising code instructions for executing a method according to the previously described embodiments and aspects. The present disclosure further provides a processor configured using code instructions for executing a method according to the previously described embodiments and aspects.

Other features and advantages of the invention will be apparent from the following specification taken in conjunction with the following drawings.

DESCRIPTION OF THE DRAWINGS

The accompanying drawings are incorporated into the specification for the purpose of explaining the principles of the embodiments. The drawings are not to be construed as limiting the invention to only the illustrated and described embodiments or to how they can be made and used. Further features and advantages will become apparent from the following and, more particularly, from the description of the embodiments as illustrated in the accompanying drawings, wherein:

FIG. 3 shows an example fine-tuning method for a neural language model for a translation task.

FIG. 5 shows experimental results of translation with a terminology constraint. Evaluation metrics included: fraction of samples satisfying constraint b(x) (↑ better), expected $D_{KL}(p_c, \pi_\theta)$ (↓ better) and $D_{KL}(\pi_\theta, a)$ (↓ better), and BLEU-4 score (↑ better) for models obtained from fine-tuning for Conditional Distributional Policy Gradient (CDPG), DPG, Ziegler, and Reinforce.

FIG. 6 shows an example set of translations of a source sentence from evaluation set generated by models fine-tuned using each of CDPG, three baselines, and an original model a.

FIG. 7 shows results of summarization experiments with factual consistency constraint. Evaluation metrics included: expected $D_{KL}(p_c, \pi_\theta)$ (↓ better) and $D_{KL}(\pi_\theta, a)$ (↓ better), precision-source (↑ better), recall-target (↑ better), number of named entities (↑ better), Distinct-2 (↑ better), ROUGE-L (↑ better) for models obtained from fine-tuning with conditional DPG, DPG, Ziegler and Reinforce.

FIG. 8 shows an example summary of a document chosen from the evaluation set generated by models fine-tuned using CDPG, the three baselines, and the original pretrained model a.

FIGS. 10A, 10B, 100, 11A and 11B show example functions obtained by sampling $\pi\theta(\cdot|c)$ conditioned on three randomly chosen signatures from evaluation set generated by c=def_init_(self) models fine-tuned using CDPG, three baselines, and original pretrained model a, with compilability constraint (FIGS. 10A, 10B, and 10C) and PEP8 constraint (FIGS. 11A and 11B), respectively.

In the drawings, reference numbers may be reused to identify similar and/or identical elements.

DETAILED DESCRIPTION

Figure 1:
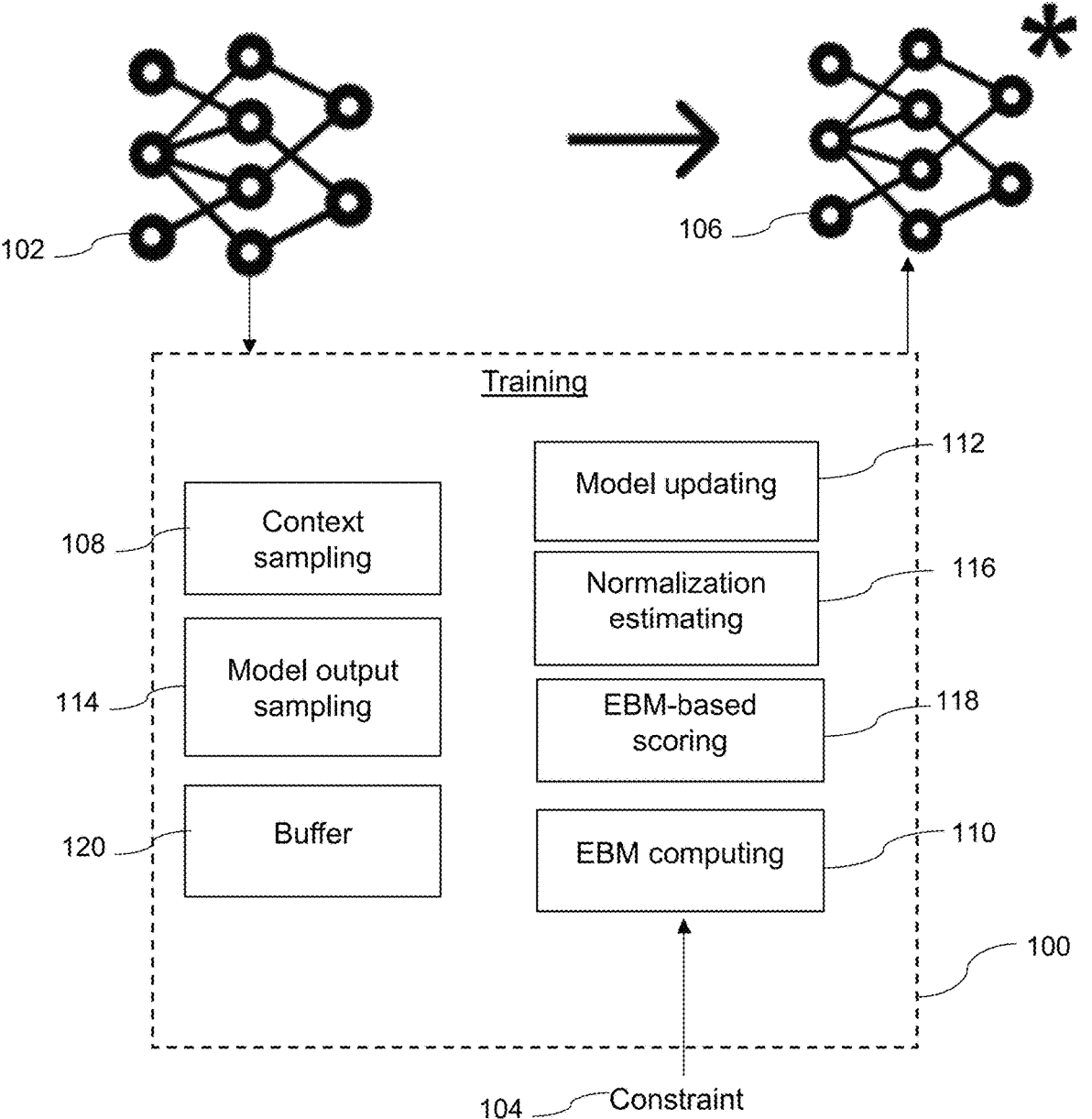
FIG. 1 shows an example processor-based system for training a neural language model.

General purpose pretrained generative models, such as but not limited to the GPT Family, T5, CLIP, Codex, etc., can be trained in a self-supervised manner on large amounts of uncurated data and can then be adapted to specific downstream tasks or control objectives. A nonlimiting example downstream task may include generating Python code, while an example control objective may be controlling the style of the generated code.

Control objectives are often motivated by a desire to address shortcomings of pretrained models. Such shortcomings may be due to, as one example, the uncurated nature of the original training data (for instance, a large portion of Python source code on the Internet violates PEP8). Another example shortcoming may be the difficulty of learning a desired behavior by purely self-supervised training (for instance, there may not be enough training signals to ensure that a model trained on source code always generates compilable code, that a summarization model always produces factually correct summaries, etc.).

Adapting and controlling pretrained generative models can present problems. One problem is that control objectives frequently lack ground truth data that could be used for supervised fine-tuning. For example, only an indicator $b(x)$ of whether a given sample x from the model satisfies a given control objective may be provided. Another problem is catastrophic forgetting, in that approaches to enforcing a control objective can result in a dramatic loss of capabilities of the original model beyond the scope of the control objective.

An approach that has been disclosed for avoiding these two problems, as disclosed in Parshakova et al., "Distributional Reinforcement Learning For Energy-Based Sequential Models". CoRR, 2019; and Khalifa et al., "A distributional approach to controlled text generation", in International Conference on Learning Representations, 2021, and in U.S. patent application Ser. No. 17/391,178, each of which being incorporated herein by reference, is to represent the control objective as an energy-based model (EBM) and then approximate that EBM using distributional policy gradients (DPG). This approach has been shown to provide great improvements in controlling pretrained language models while avoiding catastrophic forgetting. However, this disclosed approach is limited to unconditional generation tasks.

Embodiments herein provide, among other things, methods and systems implemented by a processor for fine-tuning a pre-trained neural conditional language model to perform a downstream task. Generally, given a pre-trained conditional language model having attributes with existing probability distributions conditioned on contexts, and at least one target constraint for satisfying a task-related control objective, where the target constraint specifies an expectation of a target attribute, a neural model can be trained to approximate a target conditional model that optimally reconciles a distance from the pre-trained conditional language model and the control objective across multiple contexts. The trained neural model can then be used for performing downstream tasks in response to provided contexts.

Some example methods and systems herein can provide DPG-based approaches for conditional generation tasks, including training that incorporates conditional energy-based models (EBMs). A conditional EBM $\mathcal{P}$ can define an unnormalized distribution for each context c among multiple contexts. An example context c can be provided, for instance, by a source document. Such a conditional EBM can represent the ideal behavior of a generative model given context c, as the distribution that incorporates the control objectives while remaining as close as possible to the original distribution to avoid catastrophic forgetting. This can correspond to defining multiple distributions $p_c$ indexed by c, where each distribution can be the normalization of an unconditional EBM $P_c$ as disclosed by example in Khalifa et al., 2021 and in U.S. patent application Ser. No. 17/391,178. The training objective for the conditional model can then be defined, for instance, based on minimizing divergence, such as but not limited to the average divergence, for each $p_c$.

Example methods allow, for example, the fine-tuning of conditional models that can be used in significant neural language processing (NLP) tasks such as but not limited to machine translation, summarization, code generation, or dialogue systems. Some example methods and systems for training herein can employ DPG-based methods to approximate conditional EBMs for conditional tasks and are thus referred to herein as "conditional DPGs" or "CDPGs."

In DPG-based methods using unconditional distributions, a partition function (the denominator that can be used to normalize an EBM into a probability distribution) is constant. By contrast, in example training methods herein, a partition function for a conditional EBM is dependent on the context (of which there may be many) and thus is intractable to compute exactly. To address this, for each of multiple contexts, example training methods can sample multiple outputs with a model and estimate the partition function over these samples. The output partition function estimates can then be added to a batch for applying to a loss gradient.

Figure 2:
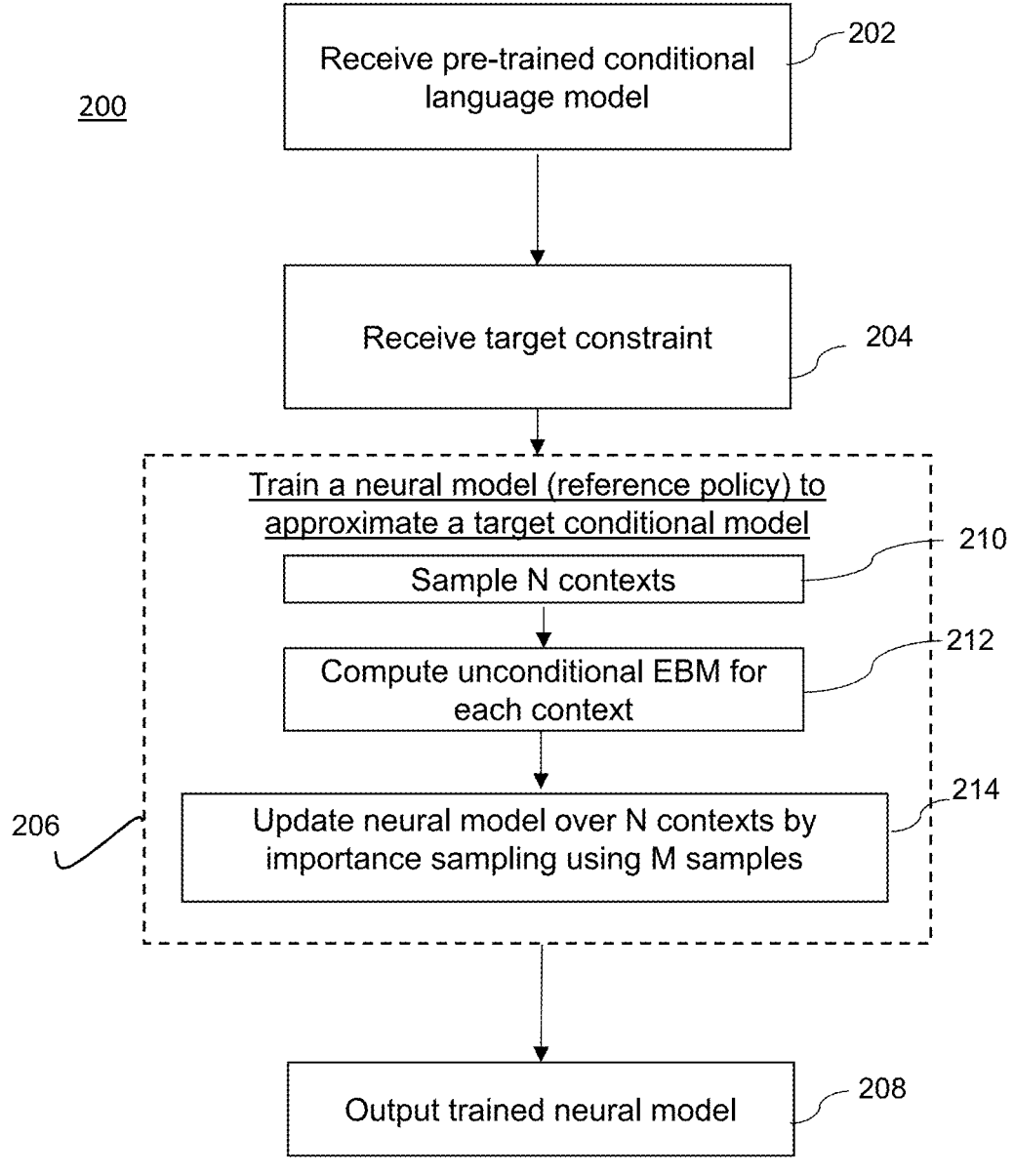
FIG. 2 shows an example method for fine-tuning a pre-trained neural conditional language model.

Turning now to the drawings, FIG. 1 shows a processor-based system 100 for training a neural language model 102, and FIG. 2 shows an example method 200 for fine-tuning a pre-trained neural conditional language model. The neural conditional language model 102 includes attributes, e.g., defined by one or more parameters and/or hyperparameters, to provide existing probability distributions that are conditioned on contexts. For example, the neural conditional language model 102 can be pretrained to receive or to provide (e.g., by processing an input) a context and generate an output, e.g., an output sequence, based on a probability distribution conditioned on the context. The output can be generated, for instance, using a beam search method or other method.

The neural conditional language model 102 may be incorporated into the processor-based system 100 or may be in communication with the processor-based system. The neural language model 102 may be any suitable prior existing neural language model and can be pre-trained to any suitable degree for performing a task. Further, the neural language model 102 can be embodied in or form a component of a sequence-to-sequence (seq2seq) model, an encoder, a decoder, a transformer-based model, etc.

In the fine-tuning method 200, the processor-based system 100 receives at 202 the neural language model 102. Additionally, the processor-based system receives at 204 a task-related target constraint 104 specifying an expectation of a target attribute. Example target attributes and constraints are provided herein. The target constraint 104 may be handcrafted in some embodiments, or may be provided in other ways, to influence the neural conditional language model 102 according to a control objective that is related in some way to the task to be performed. The target constraint 104 can be specified, for instance, by a constraint satisfaction score, a pointwise constraint (e.g., a binary constraint), a distributional constraint, or a constraint that is a hybrid of pointwise and distributional constraints. The target constraint 104 can include one or multiple constraints.

The processor-based system 100 then trains at 206 a neural model, a nonlimiting example of which being a seq2seq model, to approximate a target conditional model that optimally reconciles a distance from the pre-trained conditional language model 102 and the control objective satisfied by the target constraint 104 across multiple contexts (e.g., on average across multiple contexts). The neural model to be trained may be initialized, for instance, using or otherwise based on the (e.g., pretrained) neural language model 102.

A trained neural model 106 is then output at 208. The neural model 106 output at 208 represents the pre-trained conditional language model 102 fine-tuned using the target constraint 104 for achieving the control objective related to the task to be performed.

The neural model can be trained at 206 generally by training a reference policy by stochastic gradient descent (SGD) using a loss gradient that minimizes a distance from the pre-trained conditional language model 102 and the control objective satisfied by the target constraint 104 across multiple contexts (e.g., on average across the contexts) to provide the trained neural model. An example loss gradient minimizes an expected cross-entropy CE between the reference policy and multiple target distributions $p_c$'S, where each target distribution $p_c$ is a normalization of an unconditional energy-based model (EBM) $P_c$ mapped by the target conditional model to a context c, and where the expected cross-entropy is over a distribution $\tau(c)$ of contexts c over a set of contexts C. Example loss gradients are provided herein, though it will be appreciated that other gradients may be used.

In an example training at 206, for each of one or more iterations (e.g., epochs), N contexts are sampled at 210 from a distribution $\tau(c)$ of contexts c, e.g., by a context sampling block 108. Then, for each sampled context an unconditional energy-based model (EBM) $P_c$ is computed at 212, e.g., by EBM computing block 110 using the pre-trained conditional language model 102 and the target constraint 104. For instance, the pre-trained conditional language model 102 may be combined with (as a nonlimiting example, e.g., multiplied by or otherwise incorporate) the target constraint The neural model over the N contexts is updated, e.g., at model updating block 112, by importance sampling at 214 using, for each context, M samples from (e.g., generated by) the reference policy.

FIG. 3 shows an example of steps 210, 212, and 214 applied to fine-tuning a neural language model for a translation task. A context, e.g., a source document "Two cats are sitting on a mat" is obtained by sampling (Step 1 in FIG. 3). This source document may be a document that is desired to be translated by the translation model according to one or more translation-specific control objectives, for instance, that a translated digit should be provided as a numeral. This control objective can be satisfied by a target constraint that specifies a binary constraint satisfaction score, e.g., a 1 if all translated digits are provided as a numeral, and 0 otherwise.

In Step 2 in FIG. 3, a target distribution, e.g., an unconditional EBM, is defined for this context. In Step 2, (a) shows an existing probability distribution for the pretrained translation model conditioned on the context "Two cats are sitting on a mat", (b) shows example constraint satisfaction scores, and (a+b) shows combined probabilities given by the target distribution. In Step 3, the current model is updated to approximate the target distribution when conditioned on the sampled context.

To update the neural model (or the reference policy), for each of the N sampled contexts M samples x based on the context can be sampled, e.g., by model output sampling block 114, from the reference policy. N and M are hyperparameters. A normalization can be estimated, e.g., by normalization estimation block 116 for the unconditional energy-based model (EBM) $P_c$ for each context c over the M samples using the computed unconditional EBM for the context (e.g., from block 110). In this way, the obtained samples x can be reweighted by their likelihood according to the reference policy. In an example method for estimating the normalization, a score is computed, e.g., at EBM-based scoring block 118, for each sample x using the computed unconditional EBM for the context c. The estimated normalization can then be computed using the computed scores.

Parameters of the reference policy are then updated, e.g., by the model updating block 112, by applying the estimated normalizations to the loss gradient. The estimated normalizations can be applied, for instance, by storing each of the estimated normalizations in association with (e.g., paired with) its context-sample pair in a batch or buffer 120. The buffer 120 may be, for instance, cleared at each iteration, and after all contexts-output-estimated normalizations for that iteration are provided, the buffer can be shuffled (mixed), and the estimated normalizations can be applied to the loss gradient by iterating over the shuffled buffer.

The training at 206 can occur over a number of iterations (e.g., epochs) that can be determined using a hyperparameter. Alternatively or additionally, it can be determined whether the reference policy has sufficiently converged with the target conditional model and, if so, the training can end.

Figure 4:
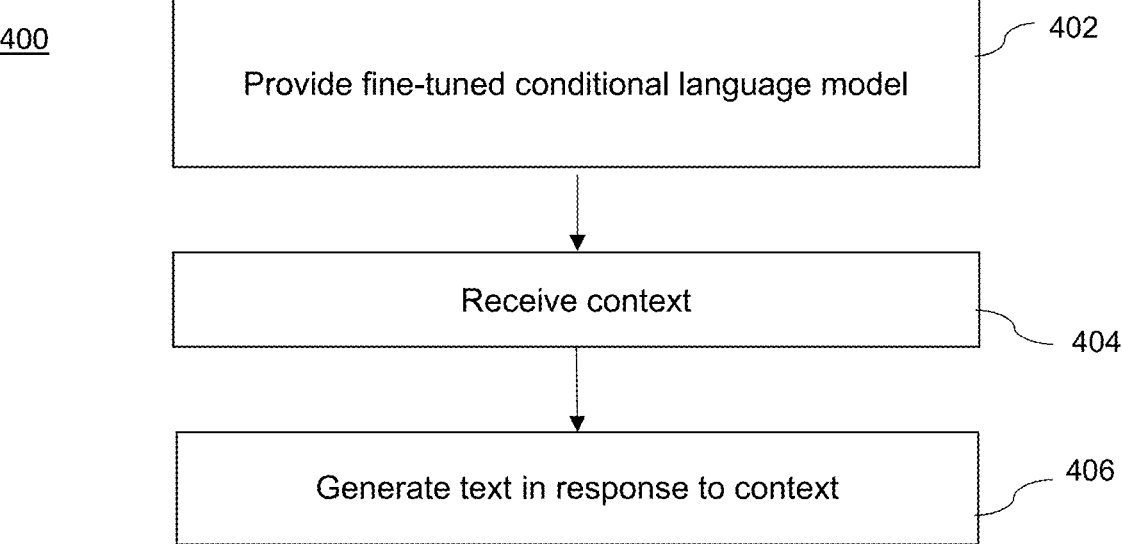
FIG. 4 shows a method for generating text in response to an input using a fine-tuned conditional language model.

The fine-tuned neural conditional language model can be used for performing a task by generating text subject to the prescribed control objectives. For example, FIG. 4 shows a method 400 for generating text, e.g., code, text for dialogue, text in response to a question, summarization, translation, etc. A trained (fine-tuned) neural language model 106 provided at 402 according to example methods herein receives at 404 a context, e.g., a source document. The source document may be received externally or may be generated internally, e.g., as part of a larger neural or other processor-based model. The trained conditional neural language model 106 generates text at 406 in response to the received context.

Example methods and systems for fine-tuning neural conditional language models can be performed in a self-supervised manner, and do not require ground-truth data. Example output fine-tuned models may be used for any suitable conditional task, and with any context.

An example fine-tuning method will now be described formally to illustrate example features. However, it will be appreciated that the models, training methods, and applications set out below are merely examples.

Unconditional EBMs: A standard, unconditional EBM can be formally defined as a function P from a (discrete, that is, finite or countable) space X to the non-negative reals, such that the partition function $Z = \Sigma_{x \in X} P(x)$ is strictly positive and finite. Denote by lowercase p the normalized distribution over X associated with P, namely $p(x) = P(x)/Z$.

The problem of fine-tuning a pretrained model a(x) to satisfy a control condition b(x)=1∀x∈X, where b(x) is a binary scorer fora desired feature, while minimizing the divergence to the original a(x) has been shown to have a unique solution given by the probability distribution p associated with the EBM $$P(x)=a(x)b(x) \tag{1}$$

In information-geometric terms, p is the I-projection of a onto the manifold of all distributions satisfying the constraint given by b.

Conditional EBMs: Consider now a discrete, potentially infinite set C of conditions c. Formally, $\mathcal{P}$, a conditional EBM over C, is defined as a function from C to the set of unconditional EBMs over X, that is, a function that maps each c∈C to an unconditional EBM $P_c(x)$ over X:

$$\mathcal{P}:c \mapsto P_c(x) \tag{2}$$

$$P_c(x) \mapsto \mathbb{R}_+ \tag{3}$$

The partition function of $P_c(x)$ can be denoted by $Z_c$, namely: $Z_c \dot{=} \Sigma_{x\in X} P_c(x)$, and $p_c(x)$ can denote the normalized version of $P_c(x)$, namely: $P_c(x) \dot{=} P_c(x)/Z_c$.

Representing constraints as conditional EBMs: The problem of fine-tuning a pretrained conditional model a(x|c) to satisfy a control objective (as a nonlimiting example, generating factually correct summaries for a summarization task) can be seen as a constraint satisfaction problem: finding a model $p_c(x)$ that meets the demands of the control objective but at the same time stays as close as possible to the original pretrained conditional model a(x|c). Such an optimal model can be represented as a conditional EBM $P_c(x)$.

A control objective can be defined in terms of a feature $\phi(x,c)$ and a corresponding desired expected value (moment constraint) of $\phi(x,c):\bar{\mu}=E_{x\sim p}\phi(x,c)$. Consider a set of contexts c∈C. For each c, there exists a unique model $p_c(x)$ that satisfies a given a moment constraint while having a minimal divergence (e.g., Kullback-Liebler (KL) divergence) from a(·|c): an I-projection of a onto the manifold of all distributions satisfying that constraint. $p_c$ can be represented as an unconditional EBM $P_c(x)$. That unconditional EBM can have the following exponential family EBM: $P_c(x)=a$ $(x|c)e^{\lambda_c \cdot \phi(x,c)}$, where $\lambda_c$ is a scalar chosen to ensure that feature moment matches its desired value; $\lambda_i$ can be estimated through self-normalized importance sampling (SNIS) and learned through stochastic gradient descent (SGD). For instance, if a(x|c) is a summarization model and $\phi_i(x,c)$ denotes the number of words in a summary x, p(x|c) will be a summarization model generating summaries that are, on average, $\bar{\mu}$ words long.

In most cases, it is useful for $\phi(x,c)$ to be a predicate that all samples x∼a(x|c) satisfy. For instance, it may be useful for all programs generated by a program synthesizer to be compilable. In that case, one can define $\phi(x,c)$ as a binary scorer and set $\bar{\mu}=1$. The first, more general constraint can be referred to as a distribution constraint, whereas the latter, frequent special case can be referred to as a pointwise constraint. For pointwise constraints, P(x,c) admits a simpler, product-of-experts form:

$$P_c(x) \dot{=} a(x|c)\phi(x,c).$$

The product-of-experts form may be used for pointwise constraints because of its numerical stability, while the exponential family form may be used for distributional constraints.

Thus, a control objective may be defined in terms of a binary scorer b(x,c) such that b(x,c)=1 if a sample (c,x)

satisfies a constraint given by a control objective (for example, x is factually correct with respect to c) and b(x,c)=0 otherwise. Consider again a set of contexts C. For each c∈C, one can frame the problem of finding the unique model $p_c(x)$ such that (i) b(x,c)=1 for all samples x∼$p_c(x)$, and (ii) $p_c(·)$ has minimal KL divergence from a(·|c) as an instance of the unconditional case. Following the above example, $p_c$ could be, for instance, a distribution over factually correct summaries of c as similar as possible to a distribution over summaries which the original model a would produce for a document c. Therefore, $p_c$ can be represented as an unconditional EBM $P_c(x)$ of the following form:

$$P_c(x) \dot{=} a(x|c)b(x,c), \tag{4}$$

which is a special case of the exponential form.

Approximating conditional EBMs: While $\mathcal{P}$ represents the target conditional model optimally reconciling distance from a(x|c) and the control objective, sampling and maximum a posteriori (MAP) decoding for $\mathcal{P}$ is intractable for two reasons. First, in practice $\mathcal{P}$ represents a potentially infinite collection of unconditional models of the form $p_c(·)$. Second, each of these unconditional models still cannot be easily sampled from because they do not admit an autoregressive factorization: b(x,c) is only defined for the whole sequence x.

The latter problem can be addressed using the distributional policy gradients (DPG) approach to approximate unconditional EBMs p using a new unconditional model $\pi_\theta$ trained to minimize the cross-entropy between p and itself. Example DPG approaches for unconditional EBMs are disclosed in Parshakova et al., 2019, Khalifa et al., 2021, and U.S. patent application Ser. No. 17/391,178.

However, since the DPG methods provided in such approaches are not directly usable for a conditional model covering infinitely many contexts c, example CDPG methods herein seek to find a single neural model $\pi_\theta$, e.g., a single neural sequence-to-sequence (seq2seq) model, approximating p on average across contexts. Particularly, example CDPG methods can minimize the expected cross-entropy between m e and multiple $p_c$'s:

$$\mathcal{L}(\theta) = \mathbb{E}_{c\sim\tau(c)}CE(p_c(·),\pi_\theta(·|c)) \tag{5}$$

Where the expectation is over $\tau(c)$, a distribution over c∈C. The gradient of this objective takes the following form:

$$\nabla_\theta \mathcal{L}(\theta) = \mathbb{E}_{c\sim\tau(c)}\nabla_\theta CE(p_c(·),\pi_\theta(·|c)) \tag{6}$$

$$= -\mathbb{E}_{c\sim\tau(c)}\mathbb{E}_{x\sim p_c(x)}\nabla_\theta \log \pi_\theta(x|c) \tag{7}$$

$$= -\mathbb{E}_{c\sim\tau(c)}\mathbb{E}_{x\sim\pi_\theta(x|c)}\frac{p_c(x)}{\pi_\theta(x|c)}\nabla_\theta \log \pi_\theta(x|c) \tag{8}$$

$$= -\mathbb{E}_{c\sim\tau(c)}\mathbb{E}_{x\sim\pi_\theta(x|c)}\frac{P_c(x)}{Z_c\pi_\theta(x|c)}\nabla_\theta \log \pi_\theta(x|c) \tag{9}$$

Where in equation (8) importance sampling is applied from $\pi_\theta$, and equation (9) expresses $p_c$ in terms of unconditional EBM $P_c$ and its partition function $Z_c$.

Both expectations in equation (9) can be approximated by sampling, e.g., Monte Carlo sampling. Intuitively, this corresponds to building unconditional EBMs $P_c(·)$ on the fly for each c∼$\tau(c)$, computing the EBM "score" $P_c(x)$ for each sample from the seq2seq model x∼$\pi_\theta(·|c)$, and then using this score as a "pseudoreward" term $P(x,c)/Z_c\pi_\theta(x|c)$ in the policy gradient estimate.

Estimating $Z_c$: The partition function $Z_c$ in equation (9) needs to be evaluated for performing CDPG. For a single unconditional EBM, there is no need to evaluate the partition function, as it merely scales gradient estimates, and therefore the function can be absorbed into the learning rate. For the conditional case as with example methods herein, $Z_c$ varies with c. Therefore, for each c, the partition function $Z_c$ can be computed using a batch of M samples $\{x_1, \ldots, x_j, \ldots x_M\}$ from $\pi_\theta(x|c_i)$. Then, the partition function $Z_c$ is estimated using importance sampling by reweighting samples $x_j$ by their likelihood according to $\pi\theta(\cdot|c_i)$.

Example training loop: $\pi_\theta$ can be trained by stochastic gradient descent (SGD) using the gradient estimate in equation (9). At each epoch, first N contexts c are sampled, and then, for each c, M samples x are sampled from $\pi_\theta(x|c)$. A buffer B can be maintained storing each $(c_i, x_j)$ pair along with its corresponding partition function $Z_{c_i}$. Then, the example training method can shuffle B and iterate over it to perform gradient steps using equation (9) with learning rate $\alpha^{(\theta)}$.

This example procedure for fine-tuning conditional language models is shown in Table 1 below, in which $\alpha^{(\theta)}$, N, and M are hyperparameters.

TABLE 1

Input: conditional EBM $P_c$ (x), initial model a(x|c)
$\pi_\theta \leftarrow a$
for each iteration do
  $\mathcal{B} \leftarrow \{ \}$
  sample batch $\{c_1, \ldots, c_i, \ldots, c_N\}$ from $\tau(c)$
  for each $c_i$ do
    sample batch $\{x_1, \ldots, x_j, \ldots, x_M\}$ from $\pi_\theta(x|c_i)$ $$\hat{Z}_{c_i} = \frac{1}{M}\sum_{j=1}^{M} \frac{P_{c_i}(x_j)}{\pi_\theta(x_j|c_i)}$$

for each $x_j$ do $$\mathcal{B} \overset{+}{\leftarrow} \left(x_j, c_i, \hat{Z}_{c_i}\right)$$

for (x, c, $\hat{Z}_c$) in shuffle($\mathcal{B}$) do $$\theta \leftarrow \theta + \alpha^{(\theta)} \frac{1}{\hat{Z}_c + \epsilon} \frac{P_c(x)}{\pi_\theta(x|c)} \nabla_\theta \log \pi_\theta(x|c)$$

Output: $\pi_\theta$

Experiments

Experiments described herein evaluated example CDPG methods on different control objectives across example tasks: translation, summarization, and code generation, using two pretrained models: T5 and GPT-Neo. Results of the experiments demonstrated that fine-tuning using example CDPG methods can robustly move the pretrained models towards meeting control objectives, without resulting in catastrophic forgetting. The experiments demonstrate the effectiveness of example CDPG methods in addressing shortcomings of pretrained generative models for such tasks.

An example toy control objective used in the experiments for translation tasks was ensuring that numeral nouns (e.g., "two") were translated as digits (e.g., "1") while other aspects of translation were unchanged. This example problem is a simple instance of a broader challenge of incorporating prior information in neural translation models. In experiments, example CDPG methods were able to make samples satisfying this constraint 116 times more likely.

For summarization tasks, a similar large, unsolved problem is ensuring that summaries are factually faithful to source documents given that summarization models are prone to hallucinating named entities never mentioned in the source. Experiments showed that a preference for factually faithful summaries (which can be operationalized as entity-level factual consistency) can be represented by a conditional EBM. They further showed that using CDPG to fine-tune T5 to approximate this EBM increased the number of correct and relevant named entities in summaries, and improved T5's Rouge score. In contrast with reinforcement learning (RL) approaches, example CDPG methods did not degrade the diversity and quality of summaries.

For code generation, a task of generating a Python function given its signature (name and arguments) was considered. While general-purpose language models can generate idiomatic Python functions, they may still struggle to learn some desired properties of generated code. For instance, a Python function generated by GPT-Neo will compile only 40% of the time and will contain on average four violations of PEP8 Style Guide for Python Code (i.e., guidelines and best practices on how to write Python code). Experiments showed that using example CDPG methods to approximate a conditional EBM expressing corresponding constraints improved both compilability and PEP8 compliance without harming the diversity of generated Python code or leading to degeneration.

In experiments, example CDPG methods were evaluated along with three baselines on four control objectives across translation, summarization, and code generation tasks. Each task was associated with $C_{train}$, a set of contexts c used for prompting the model: these were English source sentences for translation tasks, Python function signatures for code generation tasks, and source documents for summarization tasks. When computing evaluation metrics, contexts were sampled from a held out set $C_{test}$ that was not used for training. In addition, each experiment measured $\mathbb{E}_{c \sim \tau(c)} D_{KL}(p_c, \pi_\theta)$ the expected forward KL divergence from the optimal distribution $p_c$, as well as $\mathbb{E}_{c \sim \tau(c)} D_{KL}(p_c, \pi_\theta)$, the expected reverse KL divergence from the original pretrained model.

Calculation of metrics relative to $p_c$, such as $\mathbb{E}_{c \sim \tau(c)} D_{KL}(p_c, \pi_\theta)$ for KL divergence, requires estimating $Z_c$'s. This can be done using importance sampling from m e in a manner analogous to the example training loop shown in Table 1. Then, expected KL can be simplified to the following form:

$$\mathbb{E}_{c \sim \pi(c)} D_{KL}\left[p_c(x) \| \pi_\theta(x|c)\right] = \mathbb{E}_{c \sim \pi(c)} \sum_x p_c(x) \log \frac{p_c(x)}{\pi_\theta(x|c)} \tag{10}$$

$$= \mathbb{E}_{c \sim \pi(c)} \sum_x p(x|c) \log \frac{P_c(x)}{Z_c \pi_\theta(x|c)} \tag{11}$$

$$= \mathbb{E}_{c \sim \pi(c)} \left[ -\log Z_c + \sum_x p(x|c) \log \frac{P_c(x)}{\pi_\theta(x|c)} \right] \tag{12}$$

$$= \mathbb{E}_{c \sim \pi(c)} \left[ -\log Z_c + \sum_x \pi_\theta(x|c) \frac{P_c(x)}{\pi_\theta(x|c)} \log \frac{P_c(x)}{\pi_\theta(x|c)} \right] \tag{13}$$

$$= \mathbb{E}_{c \sim \pi(c)} \left[ -\log Z_c + \frac{1}{Z_c} \mathbb{E}_{x \sim \pi_\theta(x|c)} \frac{P_c(x)}{\pi_\theta(x|c)} \log \frac{P_c(x)}{\pi_\theta(x|c)} \right] \tag{14}$$

A small $\epsilon$ is added to $Z_c$ for stability. Both expectations (over $\tau$ and $\pi_\theta$) were approximated using importance sampling, using the method shown below in Table 2.

TABLE 2

Input: a distribution over queries $\tau(c)$
Input: conditional model $\pi_\theta$
Input: N, number of contexts
Input: M, number of samples for each context
  1:   sample batch $\{c_1, \ldots, c_i, \ldots, c_N\}$ from $\tau(c)$
  2:   for $i \in [1, \ldots, N]$ do
  3:      sample batch $\{x_1, \ldots, x_j, \ldots, x_M\}$ from $\pi_\theta(x|c_i)$
  4:

$$\hat{Z}_{c_i} = \frac{1}{M} \sum_{j=1}^{M} \frac{P_{c_i}(x_j)}{\pi_\theta(x_j|c_i)}$$

5:

$$D_{KL}(p, \pi_\theta) = \frac{1}{NM} \sum_{i=1}^{N} \sum_{j=1}^{M}$$

$$\left[ \frac{1}{\hat{Z}_{c_i} + \epsilon} \frac{P_{c_i}(x_j)}{\pi_\theta(x_j|c_i)} \left[ -\log \hat{Z}_{c_i} + \log \frac{P_{c_i}(x_j)}{\pi_\theta(x_j|c_i)} \right] \right]$$

Output: An estimate of $\mathbb{E}_{c \sim \tau(c)} D_{KL}(p_c, \pi_\theta)$ $\mathbb{E}_{c \sim \tau(c)} D_{KL}(\pi_\theta, a)$ was computed in a simpler manner, as it does not require estimating $Z_c$, and it is possible to directly sample from $\pi_\theta$. Essentially, the computation samples a batch of N contexts $c_i$, a batch of M samples $x_j$ from $\pi\theta(x|c_i)$ for each $c_i$, and evaluating:

$$\mathbb{E}_{c \sim \tau(c)} D_{KL}(\pi_\theta, \alpha) \approx \frac{1}{NM} \sum_{i=1}^{N} \sum_{j=1}^{M} \frac{\pi_\theta(x_j|c_i)}{\alpha(x_j|c_i)} \tag{15}$$

To avoid bias, when computing KL divergences, experiments always sampled from $\pi_\theta$ using pure ancestral sampling, as opposed to top p sampling or beam search decoding.

Baseline: DPG-like ablation: Example CDPG methods were compared to an ablation (labeled as "DPG" on figures) that sets $Z_c$ in the denominator of equation (9) to a constant Z, which is the running mean of $P_c(x)$ across x's and c's. This ablation resembles the DPG methods for unconditional EBMs disclosed in Parshakova et al., 2019 and Khalifa et al., 2021. While the partition function is constant for unconditional EBMs, in conditional EBMs $Z_c$ varies with c. Therefore, the DPG-like ablation performed gradient updates using biased gradient estimates.

Baseline: Reinforcement Learning: The problem of fine-tuning a pretrained model to satisfy a pointwise constraint b (x,c) can be posed as maximizing the expected reward $\mathbb{E}_{c \sim \tau(c)} \mathbb{E}_{x \sim \pi_\theta(x|c)} R(x,c)$. Two instances of this approach were considered: Reinforce (Williams, "Simple statistical gradient-following algorithms for connectionist reinforcement learning", in Machine Learning, pp. 229-256, 1992) and Ziegler (Ziegler et al., "Finetuning language models from human preferences", in CoRR, abs/1909.08593 and arXiv 1909.08593, 2019). For Reinforce, R(x,c)=b(x,c) was simply defined. Ziegler prevents too large departures from a by adding a KL penalty term and defining R(x,c)=b(x,c)− $\beta D_{KL}(\pi_\theta, a)$, where $\beta$ is a hyperparameter updated using an adaptive schedule.

Translation Task

Dataset: For the translation task, $\tau(c)$ from Table 1 is a uniform distribution over a fixed set of English sentences. 5 k English sentences were sampled containing numeral nouns from the English-French subcorpus of the Europarl dataset, version 7 (see Koehn, "A parallel corpus for statistical machine translation", in Proceedings of Machine Translation Summit X: Papers, pp. 79-86, Phuket, Thailand, Sep. 13-15, 2005). Metrics were computed for generated translations of another set of 5 k English sentences from the test split of Europarl. Neither CDPG nor the baselines utilize ground truth translations (references); instead, the methods computed b(x,c) based on source documents and generated translations. Ground-truth translations were only used in the experiments for evaluating a BLEU score of generated translations.

Model: Experiments were conducted on the T5 architecture (see Raffel et al., "Exploring the limits of transfer learning with a unified text-to-text transformer", in Journal of Machine Learning Research, 21(140):1-67, 2020), using the pre-trained model t5—small as $\pi_\theta$. During fine-tuning, translations x were generated that were conditioned on a source sentence c by pure ancestral sampling from $\pi_\theta$. For evaluation, the setup described by Raffel et al., 2020, was followed, and beam search decoding with beam size 4 was used.

Metrics: In addition to measuring expected $D_{KL}(p_c, \pi_\theta)$ and $D_{KL}(\pi_\theta, a)$, the experiments evaluated the forgetting of T5's capabilities in terms of BLEU-4 score, which is a measure of translation quality understood as overlap between generated and ground-truth translation. To compute the BLEU-4 score, the SacreBLEU implementation was used.

Constraint: The constraint scorer was implemented as a table lookup: b(x,c)=1 if for every occurrence of a given numeral noun (e.g., "two") in a source sentence c, a corresponding digit ("2") occurs in its translation x. Otherwise b(x,c)=0.

Results: FIG. 5 shows results of translation with terminology constraint. Evaluation metrics included: fraction of samples satisfying constraint b(x) (↑ better), expected $D_{KL}$ $(p_c, \pi_\theta)$ (↓ better) and $D_{KL}(\pi_\theta, a)$ (↓ better), and BLEU-4 score (↑ better) for models obtained from fine-tuning for conditional DPG (CDPG), DPG, Ziegler, and Reinforce.

Initial constraint satisfaction was very low: 0.006. Intuitively, it is very unlikely for T5 to translate "two" as "2" instead of "deux". However, the example CDPG method was able to boost the constraint satisfaction to 0.7 and reduce the expected divergence from its target distributions $p_c$ almost two-fold, outperforming the baseline DPG by a wide margin.

The example CDPG method also outperformed the baseline Reinforce method, staying closer to the original distribution a and not suffering from nearly any drop in BLEU-4 score (some drop is necessary for satisfying the constraint, because ground truth translations with respect to which BLEU-4 is computed almost do not satisfy the constraint themselves). In contrast, Reinforce improved constraints only at the cost of heavy divergence from a; it learned to append all the digits at the end of the translation, thus ensuring constraint satisfaction. This was reflected in a catastrophic drop in BLEU-4 score. Ziegler, on the other hand, failed to improve constraint satisfaction and stayed too close to the original distribution a.

FIG. 6 shows an example set of translations of a source sentence from evaluation set generated by models fine-tuned using each of CDPG, three baselines, and the original model a. Translations were generated by beam search, and models were fine-tuned to satisfy a terminology consistency constraint (translating numeral nouns as digits).

Summarization Task

Dataset: For conducting the summarization experiments, the CNN/DailyMail dataset was used, and 5 k source documents from the train and test subsets were sampled to use for fine-tuning and evaluation, respectively. Ground truth summaries were used only for computing reference-based evaluation metrics such as ROUGE score or recall-target. Ground-truth summaries were not used in training.

Model: The same model t5—small was used as in the experimental translation task. For fine-tuning, summaries x were generated conditioned on a source document c by pure ancestral sampling from $\pi_\theta$; for evaluation, beam search with beam size 4 was used.

Constraints: Following the procedure disclosed in Nan et al., "Entity-level factual consistency of abstractive text summarization", in Proceedings of the 16th Conference of the European Chapter of the Association for Computational Linguistics: Main Volume, pp. 2727-2733, April 2021, an entity-level factual consistency constraint was defined as a product of two constraints: there must be at least four named entities in the summary x; and all the named entities x must have occurred in the source c. More formally, let NER(·) denote the set of named entities found in a text and |·| the number of elements of a set. Then, b(x,c)=1 iff [|NER(x)|≥4]∧[NER(x)⊆NER(c)] and b(x,c)=0 otherwise.

Metrics: In addition to measuring expected $D_{KL}(p_c, \pi_\theta)$ and $D_{KL}(\pi_\theta,a)$, the quality and factual consistency of generated summaries were evaluated using the following metrics:

Precision source, defined as [|NER(x)∩NER(x)|]/|NER (x)|, is the percentage of named entities in the summary that can be found in the source. Low precision-source indicates severe hallucination.

Recall-target, defined as [|NER(x)∩NER(x)|]/|NER(t)|, is the percentage of named entities in the target summary t that can be found in the generated summary x.

Distinct-2, a measure of text diversity in terms of the frequency of bigram repetitions within a single continuation x.

ROUGE-L, a measure of summarization quality in terms of unigram overlap between the source document and ground truth summary.

NER was implemented as using a pretrained SpaCy named entity recognizer. The en_core_web_sm model was used, and the named entities that were extracted were restricted to the following categories: PERSON, FAC (buildings, airports, highways, bridges, etc.), GPE (geopolitical entities: countries, cities, etc.), ORG (companies, agencies, institutions, etc.), NORP (nationalities or religious or political groups), LOC (Non-GPE locations: mountain ranges, bodies of water, etc.), and EVENT (named hurricanes, battles, wars, sports events, etc.). Entities such as date, time, and numerals were ignored in the experiments due to the large variation in their representation in documents.

FIG. 7 shows results of summarization experiments with factual consistency constraint. Evaluation metrics included: expected $D_{KL}(p_c,\pi_\theta)$ (↓ better) and $D_{KL}(\pi_\theta,a)$(↓better), precision-source (↑ better), recall-target (↑ better), number of named entities (↑ better), Distinct-2 (↑ better), ROUGE-L (↑ better) for models obtained from fine-tuning with conditional DPG, DPG, Ziegler and Reinforce.

FIG. 7 illustrates the evolution of these seven metrics through time. The example CDPG method was the only method that stably decreased expected $D_{KL}(p_c,\pi_\theta)$ and thus approached (as opposed to drifted away from) optimal distributions $p_c$. This was reflected in moderate divergence from a and translated into downstream metrics. Summaries generated by the fine-tuned model contained, on average, more named entities. Further, name entities in summaries were both more factually consistent with the source (an increase in precision-source) and more relevant (an increase in recall-target). The tendency towards mentioning more factually consistent named entities increased the bigram diversity within summaries (Distinct-2) and the overall quality of generated summaries compared to ground truth (ROUGE-L).

This latter result initially appeared to be surprising, as the example CDPG did not have access to ground truth summaries. It is possible that the original pretrained model was biased towards mentioning too few factually correct entities, at least compared to ground truth summaries. Satisfying the factual consistency constraint reduced this bias.

In contrast, the baseline approaches did not achieve similar results. The closest results were provided by the DPG-like ablation, but these still left a significant gap in terms of all metrics and was far less stable than CDPG (e.g., its $D_{KL}(p_c,\pi_\theta)$ started to diverge again after around 500 epochs). Ziegler stayed extremely close to the original model a, but failed to improve its shortcomings. On the other hand, Reinforce heavily departed from a, pushing it to mention a large number of named entities. This resulted in artificially inflated recall-target, but no increase in precision-source and a decrease in ROUGE-L. The additional named entities were frequently irrelevant (i.e., not mentioned in ground truth summaries) or simply hallucinated.

FIG. 8 shows an example summary of a document chosen from the evaluation set generated by models fine-tuned using CDPG, the three baselines, and the original pretrained model a. Summaries were generated with beam search on $\pi_\theta(\cdot|c)$. Models were fine-tuned to satisfy entity-level factual consistency constraint. Named entities in the summaries are highlighted.

Code Generation Tasks

Dataset: For code generation experiments, a language model was conditioned on Python function signatures (both of methods and standalone functions) extracted from the Python150 dataset, which consists of Python source code obtained from GitHub. Code provided by Roziere et al., "Unsupervised translation of programming languages", in Advances in Neural Information Processing Systems, 33, 2020, was used for function extraction. 5 k functions were randomly chosen for $C_{train}$, and 5 k were chosen for $C_{test}$. $\tau(c)$ is a uniform distribution over these signatures. Ground-truth function bodies were not used for fine-tuning nor in evaluation.

Model: Experiments were conducted using GPT-Neo, an off-the-shelf, freely available autoregressive language model mirroring the GPT-3 architecture. GPT-Neo's training set included 85 GiB of source code from GitHub, which endowed it with some code completion abilities. The gpt-neo-125 variant available on Huggingface Transformers was used. During both fine-tuning and evaluation, function bodies were generated by conditioning on signatures using pure ancestral sampling.

Constraints: For experiments with compilability control condition, experiments checked compilability of a Python function declaration obtained by concatenating [c,x] and trying to execute it. b(x,c)=1 if the Python interpreter raised an exception and b(x,c)=0 otherwise. To check for compatibility, experiments called the compile_command function from the codeop module of Python Standard Library with a sequence obtained by string concatenation [c,x] as argument. It was then checked if compile_command returned a code object. The only postprocessing applied was removing any characters from x after the end of function declaration (with function end defined in terms of indentation), as the experiments were concerned specifically with function generation. Codeop.compile_command is the implementation that Python interactive interpreters use in read-eval-print loop (REPL) to determine whether a string is a valid Python code. In experiments, compatibility refers only to syntactic correctness, as the Python interpreter does not execute the body of a function at function declaration time.

For experiments with PEP8-compliance control condition, it was checked whether a function declaration given by [c,x] violated PEP8, the style guide for Python, by running pycodestyle, an off-the-shelf linter (static code analysis tool) was run. b(x,c)=1 if the number of PEP8 violations found by pycodestyle was 0, otherwise b(x,c)=0.

Metrics: The quality of generated Python functions were evaluated using the following metrics:

PEP8 error count, the average number of violations of PEP8. To compute the number of PEP8 violations triggered by a sequence [c,x], pycodestyle was run, and the number of violations it reports was reported.

Compilability, the fraction of samples [c,x] that compile.

The average number of characters in [c,x] (after detokenization).

The average number of nodes in an abstract syntax tree (AST) of sequences that compile. Intuitively, this metric indicates the logical (as opposed to surface) complexity of generated programs. To compute AST node count, the average number of nodes in abstract syntax trees (ASTs) of generated functions, only samples that compile were considered. They were parsed to their corresponding ASTs using the ast module from Python Standard Library.

Figure 9:
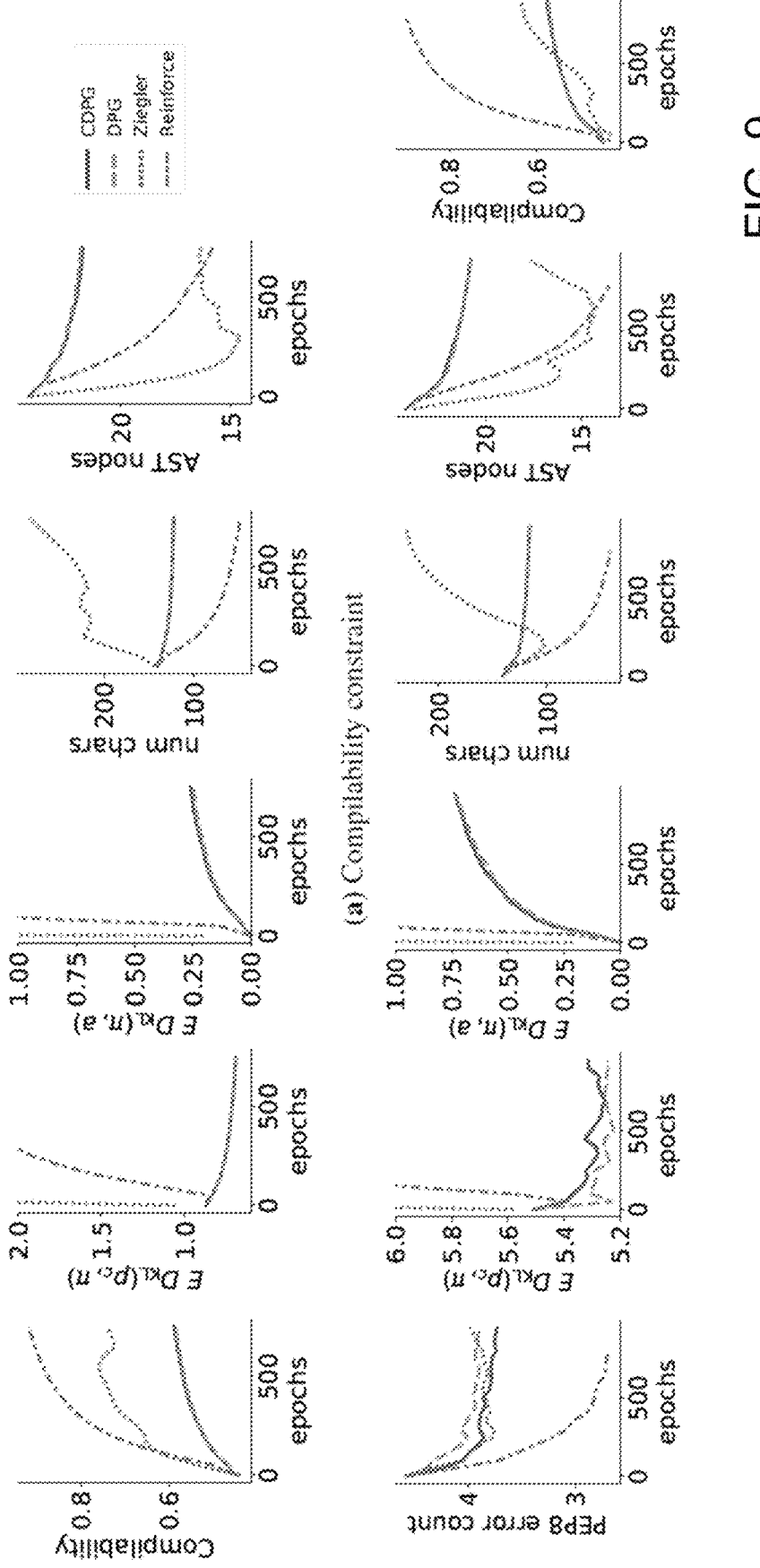
FIG. 9 shows results of code generation experiments with compilability (a) and PEP8 (b) constraints. Evaluation metrics included compilability (↑ better), number of PEP8 errors (↓ better), expected $D_{KL}(p_c, \pi_\theta)$ (↓ better) and $D_{KL}(\pi_\theta, a)$ (↑ better), number of characters, and AST node count (↑ better) for models obtained from fine-tuning with CDPG, DPG, Ziegler, and Reinforce.
Figure 12A:
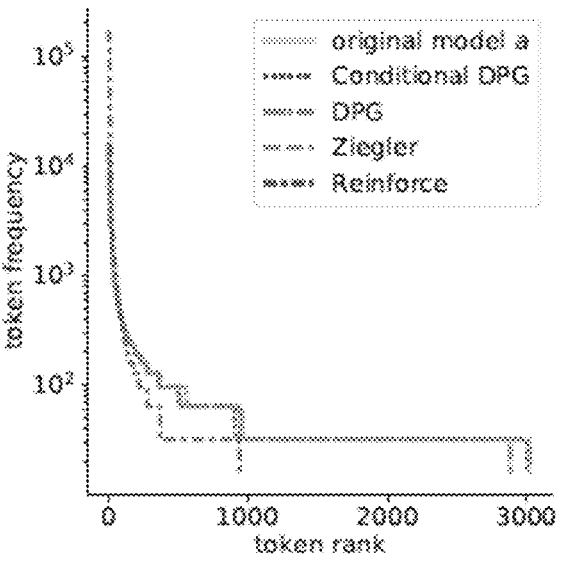
FIGS. 12A-12D show token frequency against token rank computed for tokens in 10280 samples from a pretrained model a, example CDPG methods, and baselines for tasks of translation with terminology constraint (FIG. 12A), summarization with factual consistency constraint (FIG. 12B), code generation with compilability constraint (FIG. 12C) and code generation with PEP8 constraint (FIG. 12D), where longer tails imply more diverse samples.
Figure 12B:
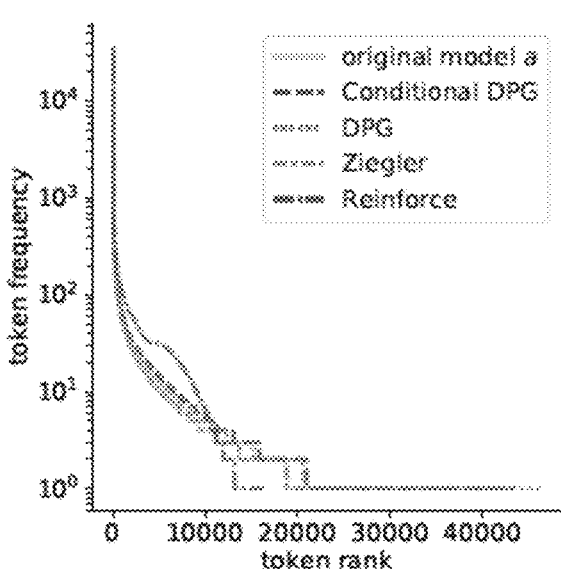
Figure 12C:
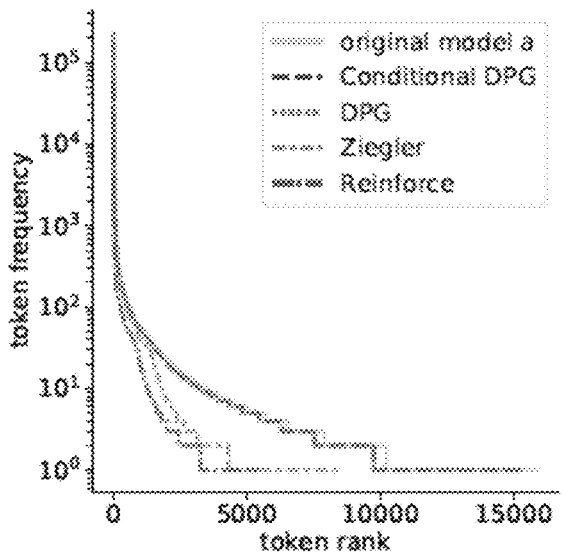
Figure 12D:
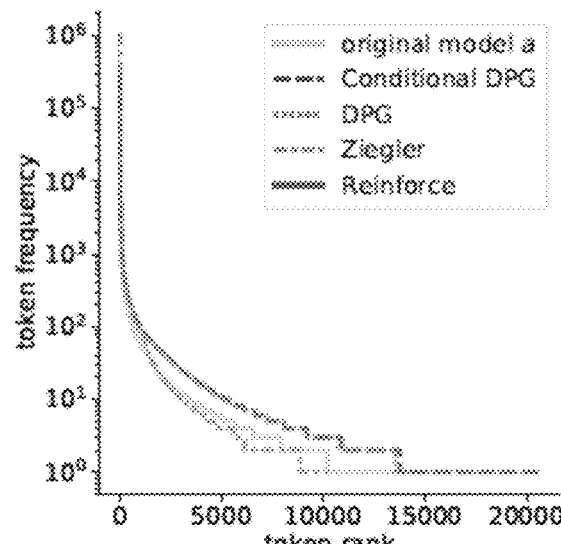

Results: FIG. 9 illustrates the evolution of metrics through time. CDPG was able to increase the fraction of compilable functions from around 40% to around 65% and decrease the average number of PEP8 violations. Incidentally, the PEP8 control objective also leads to an increase in compilability because many PEP8 violations are also compilation errors. FIG. 9 shows results of code generation experiments with compilability (a) and PEP8 (b) constraints. Evaluation metrics included compilability (↑ better), number of PEP8 errors (↓ better), expected $D_{KL}(p_c,\pi_\theta)$ (↓ better) and $D_{KL}(\pi_\theta,a)$ (↓ better), number of characters, and AST node count (↑ better) for models obtained from fine-tuning with CDPG, DPG, Ziegler, and Reinforce.

As with the previously described results, here CDPG and its DPG-like ablation were the only methods actually approaching optimal distributions and diverging moderately from a. This allowed them to maintain the original statistics of a: length and the number of nodes in AST trees of generated functions. In contrast, Reinforce learned to generate shorter functions (having less opportunity for mistakes), and Ziegler produced heavily degenerated samples: syntactically simple functions with severe repetitions. This is reflected in an increase in length and a decrease in AST nodes count.

Figure 10A:
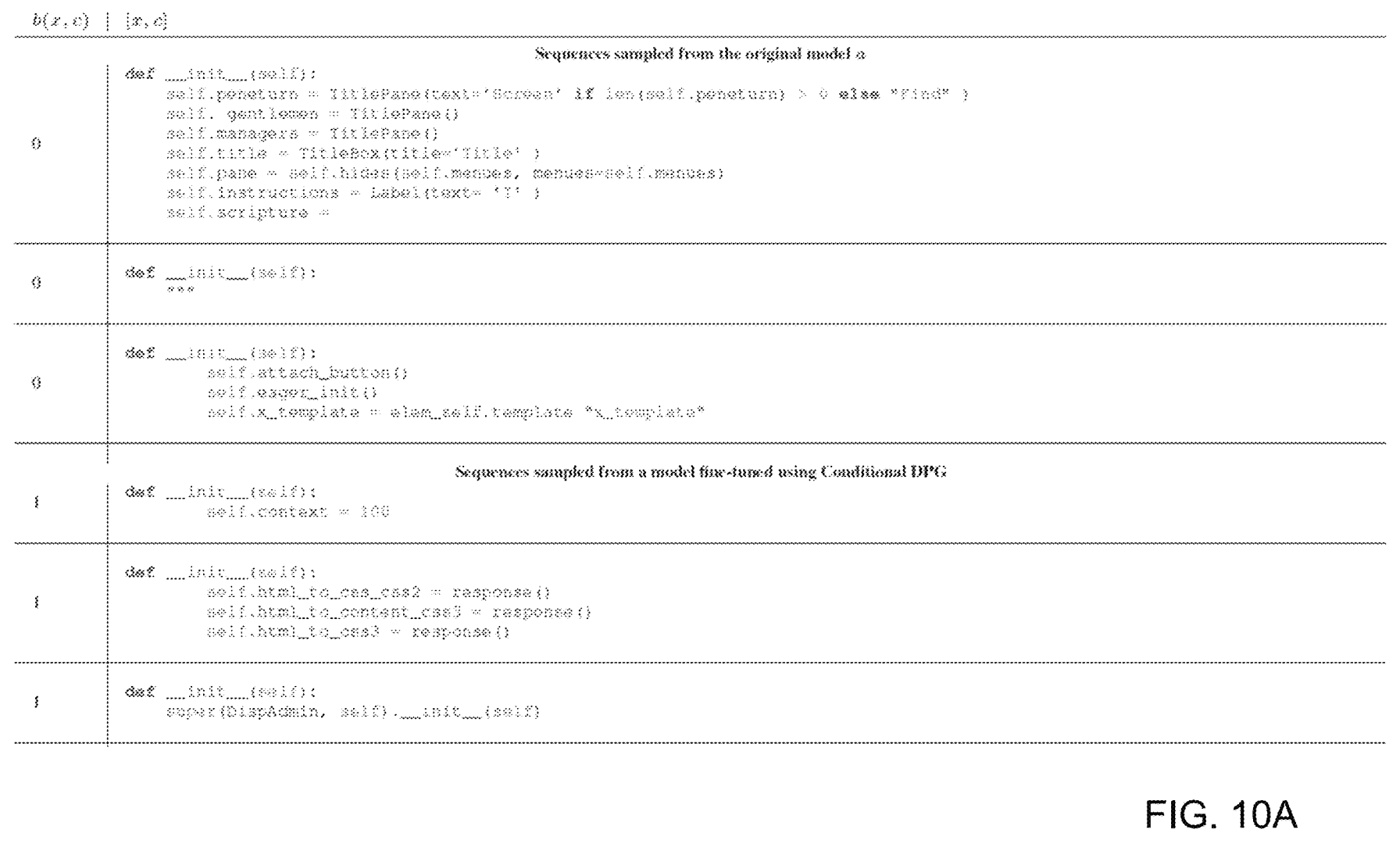
Figure 10B:
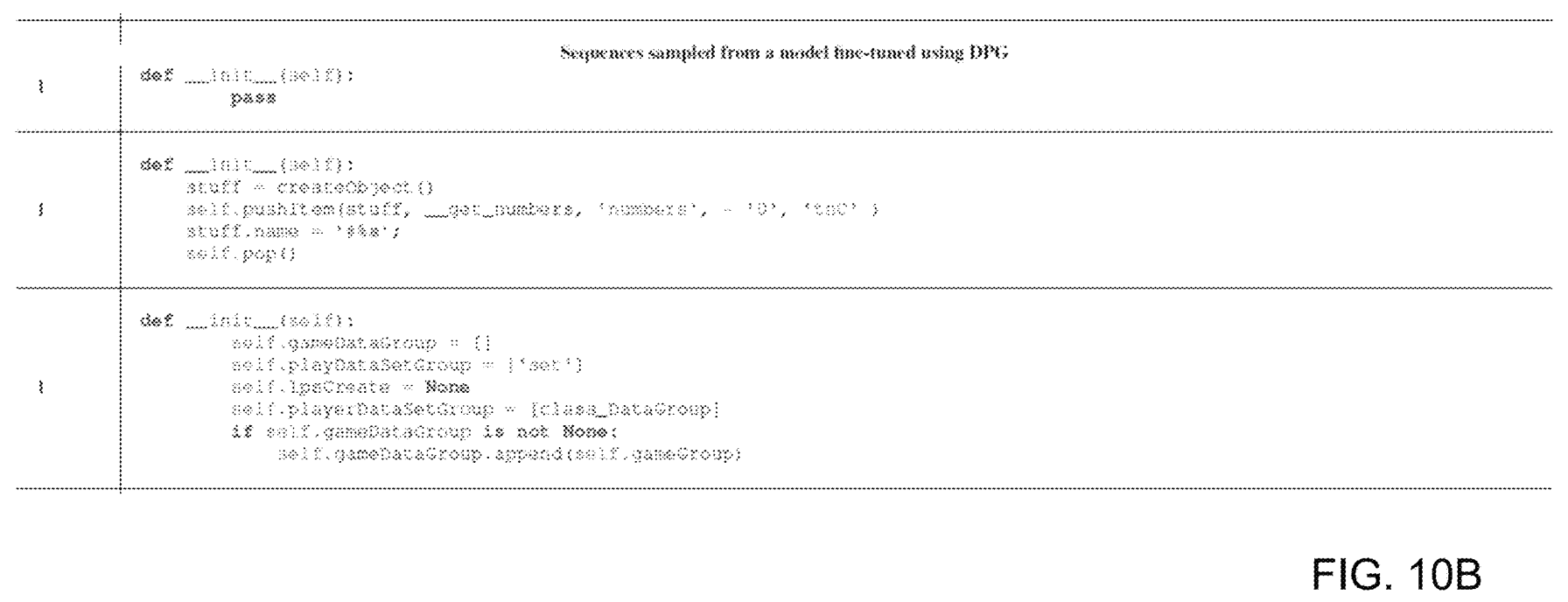
Figure 11A:
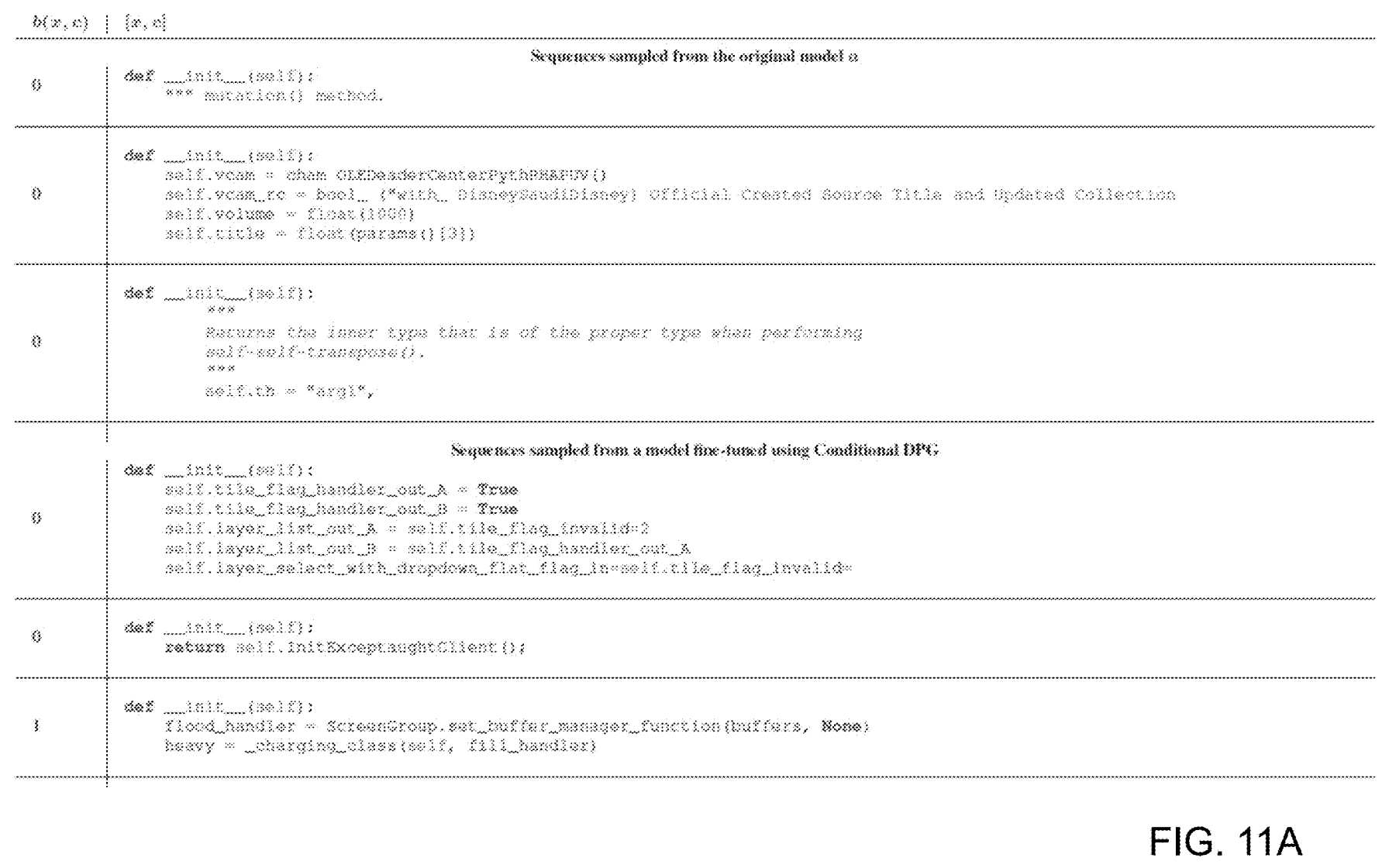
Figure 11B:
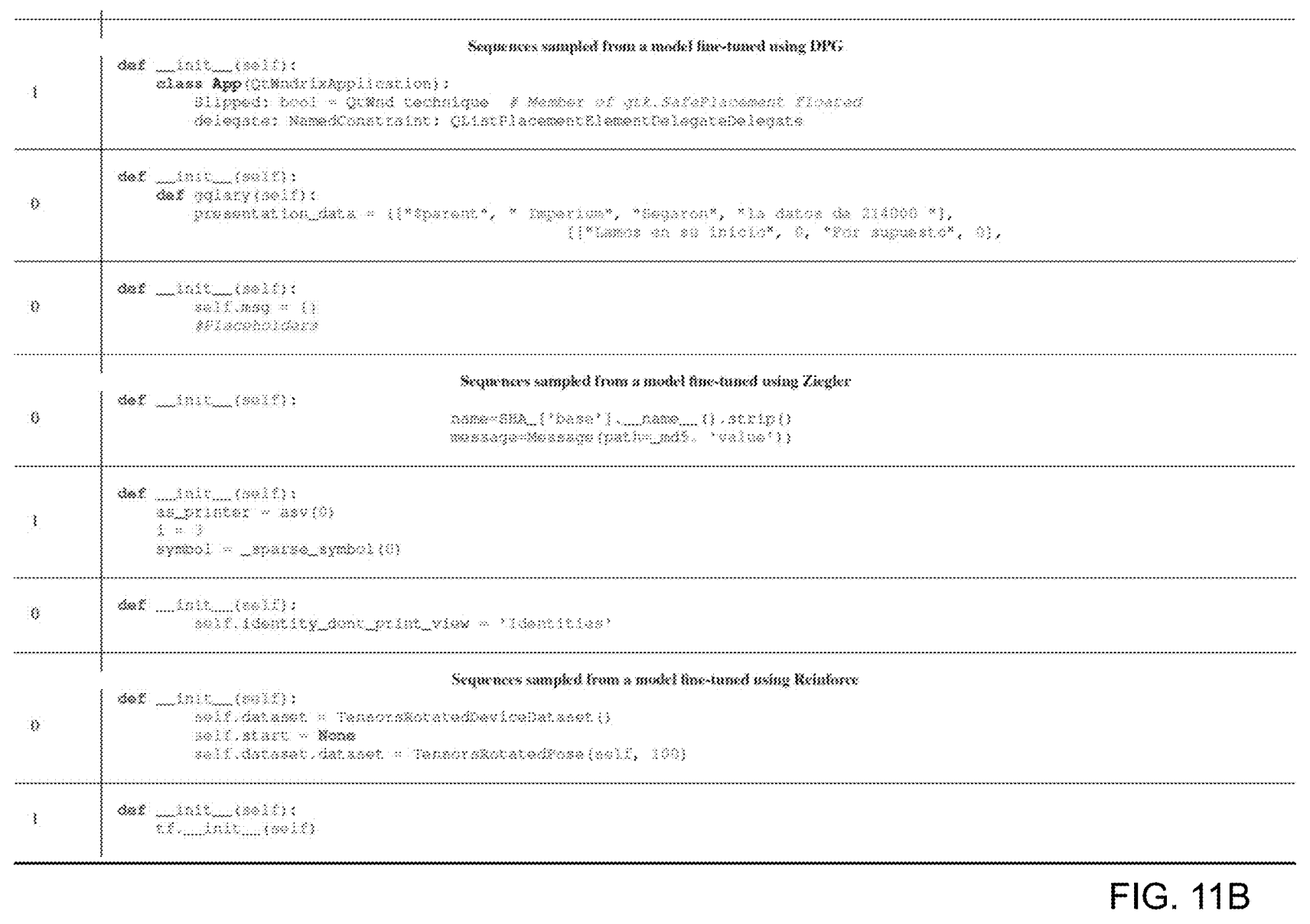

FIGS. 10-11 show example functions obtained by sampling $\pi_\theta(\cdot|c)$ conditioned on three randomly chosen signatures from evaluation set generated by c=def_init_(self) models fine-tuned using CDPG, three baselines, and original pretrained model a, with compilability constraint (FIGS. 10A, 10B, and 10C) and PEP8 constraint (FIGS. 11A and 11B), respectively. Pure ancestral sampling was used.

The performance gap between CDPG and its DPG-like ablation was closer for code generation (especially with the compilability control objective) than for summarization. This can be accounted for by the normalized standard deviation of partition functions $Z_c$ for EBMs $P_c$ in the range of conditional EBMs $\mathcal{P}$ for each control objective. Here, normalized standard deviations of $Z_c$ can be defined as $std(Z_c)/avg(Z_c)$, where $$avg(Z_c) = \frac{1}{N}\sum_{i=1}^{N} Z_{c_i} \tag{16}$$

$$std(Z_c) = \sqrt{\frac{1}{N}\sum_{i=1}^{N}\left(Z_{c_i} - avg(Z_c)\right)^2} \tag{17}$$

For code generation, this standard deviation was lower, meaning that $Z_c$ in equation (9) is better approximated by a constant that can be absorbed into the learning rate $\alpha^{(\theta)}$. For summarization, this variance was higher, and therefore ignoring the $Z_c$ term incurs higher bias, which translates into worse performance.

All models were implemented using PyTorch and HuggingFace Transfomers. Each training took approximately five days on two Nvidia V100 GPUs. Table 3 shows hyperparameters for the code generation, while Table 4 shows hyperparameters for the translation and summarization experiments.

TABLE 3

| Hyperparameter | Value | Symbol |
|---|---|---|
| Common | | |
| original model | EleutherAI/ gpt-neo-125M | $\alpha$ |
| batch size | 2048 | |
| maximum sequence length | 128 tokens | |
| learning rate for $\pi_\theta$ | $1.41 \times 10^{-6}$ | $\alpha^{(\theta)}$ |
| optimizer | Adam (Kingma & Ba, 2014) | |
| learning rate schedule | Constant with warmap (100 epochs) | |
| total epochs | 1000 | |
| number of c's for training | 5000 | $|C_{min}|$ |
| number of c's per batch | 32 | N |
| number of $\alpha$'s per c | 64 | M |
| Ziegler | | |
| policy gradients clip range | 0.2 | |
| target KL value for adaptive schedule | 6.0 | |
| initial coefficient of KL penalty | 0.2 | $\beta$ |

TABLE 4

| Hyperparameter | Value | Symbol |
|---|---|---|
| Common | | |
| original model | t5-small | $\alpha$ |
| batch size | 1024 | |
| maximum sequence length | 200 tokens | |
| learning rate for $\pi_\theta$ | $1 \times 10^{-4}$ | $\alpha^{(\theta)}$ |
| optimizer | Adam (Kingma & Ba, 2014) | |
| learning rate schedule | constant with warmup (100 epochs) | |
| total epocha | 1000 | |
| number of c's for training | 5000 | $|C_{min}|$ |
| number of c's por batch | 32 | N |
| number of $\alpha$'s per c | 32 | M |
| Ziegler | | |
| policy gradients clip range | 0.2 | |
| target KL value for adaptive schedule | 6.0 | |
| initial coefficient of KL penalty | 0.2 | $\beta$ |

Qualitative Analysis

For a better understanding of how different fine-tuning approaches affected the distributions of final models, relative frequencies of errors (most common compilation errors, absolute frequencies of most common PEP8 violations) for the code generation task, and absolute frequencies of named entities for the summarization task were provided in a batch of (10280) samples from the original model a as well as models obtained from fine-tuning with CDPG, DPG, Ziegler, and Reinforce. While errors and named entities differed significantly in their frequency, CDPG consistently decreased frequencies of these errors and consistently increased the frequencies of all kinds of named entities, including the long tail of rare ones.

To compare lexical diversity of samples obtained from fine-tuned models (for all four tasks), frequencies of each token (the number of times it occurred) and its rank (its index in a sorted list of tokens) are shown in FIGS. 12A-12D. CDPG and its DPG-like ablation were able to closely match token frequencies, while Ziegler and Reinforce tended to have shorter tails of rare tokens.

In contrast with prior methods, example CDPG methods do not require ground-truth training data, and are able to shift model distribution in a minimally invasive way. As a result, models fine-tuned with example CDPG methods can share desired characteristics, such as improved factual consistency, compilability, or others, with the fluency and diversity of the original model.

Example CDPG methods may be used to fine-tune for additional tasks such as but not limited to dialogue tasks. Further, example CDPG methods can be used with other control objectives, such as but not limited to constraining semantics of generated Python functions. CDPG may also be extendable to approximate conditional analogues of a more general, exponential form EBMs, e.g., the exponential form as disclosed in Khalifa et al., 2021, which can represent distributional constraints, namely, desired expected values for certain features of generated samples.

Network Architecture

Figure 13:
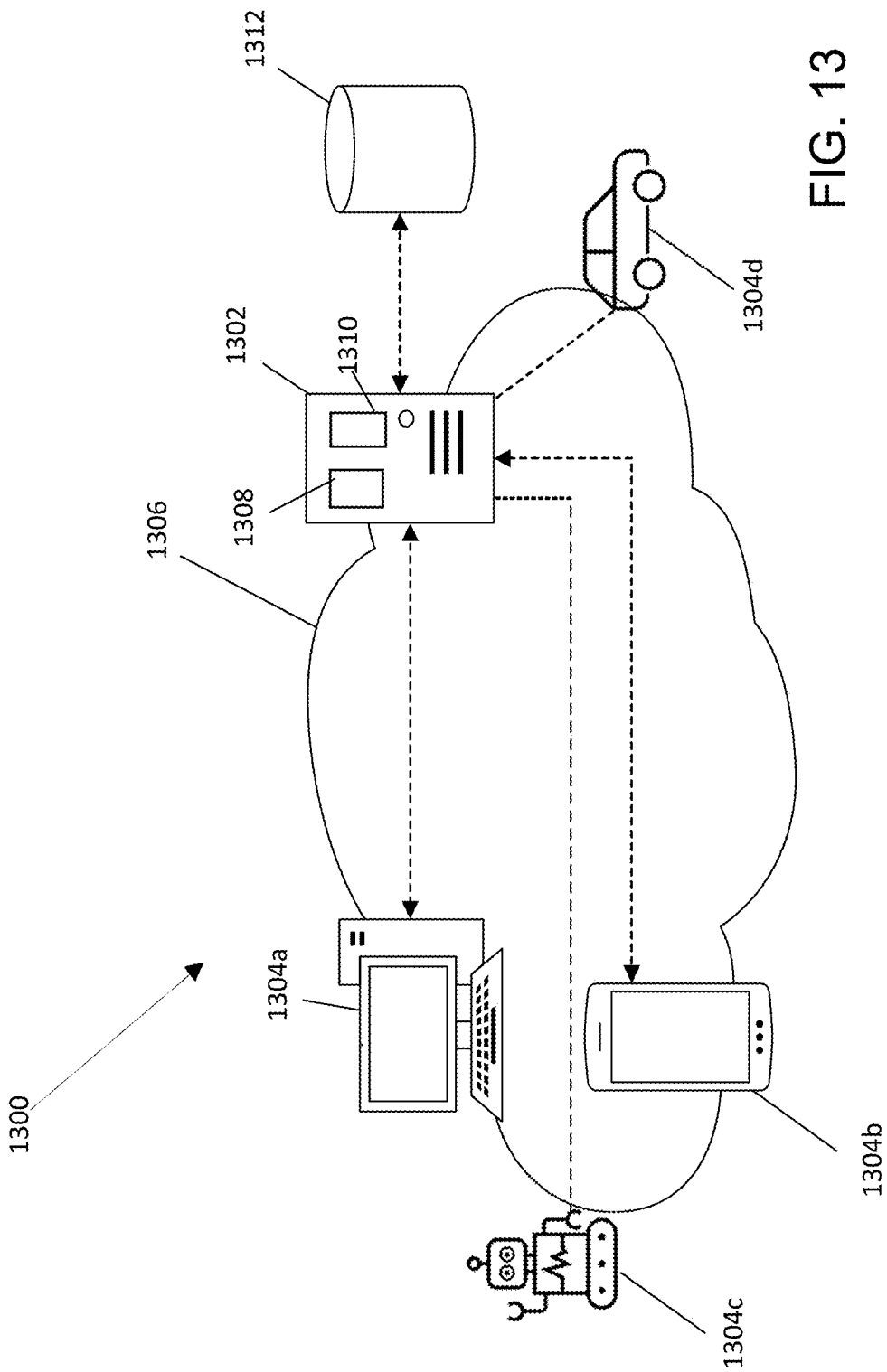
FIG. 13 shows an example architecture in which example methods can be implemented.

Example systems, methods, and embodiments may be implemented within a network architecture 1300 such as illustrated in FIG. 13, which comprises a server 1302 and one or more client devices 1304 that communicate over a network 1306 which may be wireless and/or wired, such as the Internet, for data exchange. The server 1302 and the client devices 1304a, 1304b can each include a processor, e.g., processor 1308 and a memory, e.g., memory 1310 (shown by example in server 1302), such as but not limited to random-access memory (RAM), read-only memory (ROM), hard disks, solid state disks, or other non-volatile storage media. Memory 1310 may also be provided in whole or in part by external storage in communication with the processor 1308.

The processor-based system 100 (shown in FIG. 1) may be embodied in the server 1302 and/or client devices 1304. It will be appreciated that the processor 1308 can include either a single processor or multiple processors operating in series or in parallel, and that the memory 1310 can include one or more memories, including combinations of memory types and/or locations. Server 1302 may also include, but are not limited to, dedicated servers, cloud-based servers, or a combination (e.g., shared). Storage, e.g., a database, may be embodied in suitable storage in the server 1302, client device 1304, a connected remote storage 1313 (shown in connection with the server 1302, but can likewise be connected to client devices), or any combination.

Client devices 1304 may be any processor-based device, terminal, etc., and/or may be embodied in a client application executable by a processor-based device, etc. Client devices may be disposed within the server 1302 and/or external to the server (local or remote, or any combination) and in communication with the server. Example client devices 1304 include, but are not limited to, autonomous computers 1304a, mobile communication devices (e.g., smartphones, tablet computers, etc.) 1304b, robots 1304c, autonomous vehicles 1304d, wearable devices, virtual reality, augmented reality, or mixed reality devices (not shown), or others. Client devices 1304 may be configured for sending data to and/or receiving data from the server 1302, and may include, but need not include, one or more output devices, such as but not limited to displays, printers, etc. for displaying or printing results of certain methods that are provided for display by the server. Client devices may include combinations of client devices.

In an example method, the server 1302 or client devices 1304 may receive a pre-trained model, context, a constraint, an input for processing to provide a context, etc. from any suitable source, e.g., from memory 1310 (as nonlimiting examples, internal storage, an internal database, etc.), from external (e.g., remote) storage 1313 connected locally or over the network 1306.

The example training method can generate a trained, e.g., fine-tuned, model that can be likewise stored in the server (e.g., memory 1310), client devices 1304, external storage 1312, or combination. In some example embodiments provided herein, training (including pre-training or fine-tuning) and/or inference may be performed offline or online (e.g., at run time), in any combination. Results can be output (e.g., displayed, transmitted, provided for display, printed, etc.) and/or stored for retrieving and providing on request.

In an example sequence generating method the server 1302 or client devices 1304 may receive one or more inputs, e.g., sequences or contexts, from any suitable source, e.g., by local or remote input from a suitable interface, or from another of the server or client devices connected locally or over the network 1306. Trained models such as the model 106 can be likewise stored in the server (e.g., memory 1310), client devices 1304, external storage 1312, or combination. In some example embodiments provided herein, training and/or inference may be performed offline or online (e.g., at run time), in any combination. Results can be output (e.g., displayed, transmitted, provided for display, printed, etc.) and/or stored for retrieving and providing on request.

In an example text generation method the server 1302 or client devices 1304 may receive a context or an input that may be processed to provide a context from any suitable source, e.g., by local or remote input from a suitable interface, or from another of the server or client devices connected locally or over the network 1306 and process the input using example neural models (or by a more straightforward tokenization, in some example methods). Trained models can be likewise stored in the server (e.g., memory 1310), client devices 1304, external storage 1312, or combination. Results can be output (e.g., displayed, transmitted, provided for display, printed, etc.) and/or stored for retrieving and providing on request.

Generally, embodiments can be implemented as computer program products with a program code or computer-executable instructions, the program code or computer-executable instructions being operative for performing one of the methods when the computer program product runs on a computer. The program code or the computer-executable instructions may, for example, be stored on a computer-readable storage medium.

In an embodiment, a storage medium (or a data carrier, or a computer-readable medium) comprises, stored thereon, the computer program or the computer-executable instructions for performing one of the methods described herein when it is performed by a processor.

Embodiments described herein may be implemented in hardware or in software. The implementation can be performed using a non-transitory storage medium such as a computer-readable storage medium, for example a floppy disc, a DVD, a Blu-Ray, a CD, a ROM, a PROM, and EPROM, an EEPROM ora FLASH memory. Such computer-readable media can be any available media that can be accessed by a general-purpose or special-purpose computer system.

General

Embodiments of the present invention provide, among other things, a method implemented by a processor for fine-tuning a pre-trained neural conditional language model to perform a downstream task, the method comprising: receiving the pre-trained conditional language model having attributes with existing probability distributions conditioned on contexts; receiving at least one target constraint for satisfying a task-related control objective associated with the downstream task, the target constraint specifying an expectation of a target attribute; training a neural model to approximate a target conditional model that optimally reconciles a distance from the pre-trained conditional language model and the control objective across multiple contexts; and outputting the trained neural model representing the pre-trained neural conditional language model fine-tuned to perform the downstream task. In addition to any of the above features in this paragraph, the trained neural model may comprise a sequence-to-sequence (seq2seq) model. In addition to any of the above features in this paragraph, the trained neural model may comprise at least a portion of a sequence-to-sequence (seq2seq) model. In addition to any of the above features in this paragraph, the trained neural model may comprise a decoder. In addition to any of the above features in this paragraph, the trained neural model may be trained to approximate a target conditional model that optimally reconciles a distance from the pre-trained conditional language model and the control objective on average across multiple contexts. In addition to any of the above features in this paragraph, training a seq2seq model may comprise: initializing a reference policy; and training the reference policy by stochastic gradient descent using a loss gradient that minimizes a distance from the pre-trained conditional language model and the control objective across multiple contexts to provide the trained neural seq2seq model. In addition to any of the above features in this paragraph, the loss gradient may minimize a distance from the pre-trained conditional language model and the control objective on average across multiple contexts to provide the trained neural seq2seq model. In addition to any of the above features in this paragraph, the loss gradient may minimize an expected cross-entropy CE between the reference policy and multiple target distributions $p_c$'s, where each target distribution $p_c$ is a normalization of an unconditional energy-based model (EBM) $P_c$ mapped by the target conditional model to a context c, and where the expected cross-entropy is over a distribution $\tau(c)$ of contexts c over a set of contexts C. In addition to any of the above features in this paragraph, training a seq2seq model may comprise: for each of one or more iterations: sampling N contexts from the distribution $\tau(c)$ of contexts c; computing the unconditional energy-based model (EBM) $P_c$ for each sampled context c over the distribution $\tau(c)$ of contexts c using the pre-trained conditional language model and the target constraint; and updating the neural model over the N contexts by importance sampling using, for each context, M samples from the reference policy. In addition to any of the above features in this paragraph, the distribution $\tau(c)$ of contexts c may be provided from a set of source documents. In addition to any of the above features in this paragraph, updating the neural model may comprise: for each sampled context, sampling M samples x from the reference policy based on the context; estimating a normalization for the unconditional energy-based model (EBM) $P_c$ for each context c over the M samples using the computed unconditional EBM for the context; and updating parameters of the reference policy by applying the estimated normalization for each context-sample pair to the loss gradient; where M and N are hyperparameters. In addition to any of the above features in this paragraph, the unconditional EBM $P_c$ may correspond to the target distribution $p_c$; and the target distribution $p_c$ may be conditioned on the context c based on probabilities provided by the pre-trained conditional language model for the context a(x/c) and the target constraint for the context b(x/c). In addition to any of the above features in this paragraph, the target constraint may be specified by a constraint satisfaction score that is combined with the probabilities provided by the pre-trained conditional language model for the context. In addition to any of the above features in this paragraph, the target constraint may comprise a pointwise constraint. In addition to any of the above features in this paragraph, the target constraint may comprise a binary constraint. In addition to any of the above features in this paragraph, the target constraint may comprise a distributional constraint. In addition to any of the above features in this paragraph, the target constraint may comprise a hybrid of a pointwise and a distributional constraint. In addition to any of the above features in this paragraph, the target constraint may comprise multiple constraints. In addition to any of the above features in this paragraph, the reference policy may be initialized using the pre-trained conditional language model. In addition to any of the above features in this paragraph, the estimated normalization for each context-sample pair may be stored in a buffer during each iteration. In addition to any of the above features in this paragraph, applying the estimated normalization for each context-sample pair to the loss gradient may comprise: shuffling the buffer; and iterating over the shuffled buffer. In addition to any of the above features in this paragraph, estimating a normalization may further comprise: computing the estimated normalization over the M obtained samples by importance sampling; and/or reweighting the obtained samples by their likelihood according to the reference policy. In addition to any of the above features in this paragraph, estimating a normalization may comprise: computing a score for each sample x using the computed unconditional EBM for the context c; and computing the estimated normalization using the computed scores. In addition to any of the above features in this paragraph, the estimated normalization may comprise a normalizing constant or partition function. In addition to any of the above features in this paragraph, the N sample contexts may be source documents from the set of contexts $\tau(c)$. In addition to any of the above features in this paragraph, the source documents may be provided from one or more of a dataset, an encoder encoding an input sequence, or a portion of the pretrained model. In addition to any of the above features in this paragraph, the method may further comprise: determining if the reference policy has converged with the target conditional model; and ending the training if the reference policy has converged with the target conditional model. In addition to any of the above features in this paragraph, the fine-tuning may be self-supervised. In addition to any of the above features in this paragraph, the fine-tuning may omit (not use) ground truth data. In addition to any of the above features in this paragraph, the pre-trained conditional language model may be an autoregressive model. In addition to any of the above features in this paragraph, the trained neural conditional language model may be incorporated within a sequence-to-sequence (seq2seq) model. In addition to any of the above features in this paragraph, the task may be or include a summarization task. In addition to any of the above features in this paragraph, the context may be provided by processing a document to be summarized, and the constraint may be based on factual correctness of the summarized document. In addition to any of the above features in this paragraph, the task may be or include a code generation task. In addition to any of the above features in this paragraph, the constraint may be based on compilability and/or compliance with a standard. In addition to any of the above features in this paragraph, the task may be or include a translation task. In addition to any of the above features in this paragraph, the context may be provided by processing a document to be translated, and the constraint may be based on consistency of terminology. In addition to any of the above features in this paragraph, the task may be or include a dialogue task, and the constraint may be provided by processing a dialogue input. In addition to any of the above features in this paragraph, the trained neural conditional language model may generate text using beam search.

According to additional embodiments, a method for generating text may comprise receiving a context by a trained neural language model trained according to any of the methods in the preceding paragraph; the trained neural seq2seq model generating text in response to the received context. In addition to any of the above features in this paragraph, the context may be directly input, indirectly input and/or retrieved from a dataset. According to additional embodiments, a method for generating text may comprise: receiving an input sequence; processing the input sequence to determine a context; and processing the context by a trained neural model trained according any of the methods in the preceding paragraph to generate text in response to the context. Additional embodiments of the present invention provide, among other things, a non-transitory computer-readable medium having executable instructions stored thereon for causing a processor and a memory to implement any of the methods according to any of the methods in the preceding paragraph. Embodiments of the present invention provide, among other things, a processor-based system configured to perform any of the methods in the preceding paragraph. Embodiments of the present invention provide, among other things, a non-transitory computer-readable medium having executable instructions stored thereon for causing a processor and a memory to implement a method for fine-tuning a pre-trained neural conditional language model to perform a downstream task, the method comprising: receiving the pre-trained conditional language model having attributes with existing probability distributions conditioned on contexts; receiving at least one target constraint for satisfying a task-related control objective associated with the downstream task, the target constraint specifying an expectation of a target attribute; training a neural model to approximate a target conditional model that optimally reconciles a distance from the pre-trained conditional language model and the control objective across multiple contexts; and outputting the trained neural model. The method may include any of the features in the preceding paragraph.

Additional embodiments of the present invention provide, among other things, a processor-based system for fine-tuning a pre-trained neural conditional language model to perform a downstream task. The processor-based system may comprise: an energy-based model (EBM) computing block configured to compute an energy-based model based on a received pre-trained conditional language model having attributes with existing probability distributions conditioned on contexts and at least one received target constraint for satisfying a task-related control objective, the target constraint specifying an expectation of a target attribute; a context sampling block configured to sample a plurality of contexts; a model output sampling block configured to sample a plurality of model outputs associated with each sampled context; a normalization estimating block configured to estimate a normalization based on said computed energy-based model and said sampled plurality of model outputs; and a model updating block for training a neural model to approximate a target conditional model that optimally reconciles a distance from the pre-trained conditional language model and the control objective across multiple contexts based on a loss gradient determined using said estimated normalization; the model updating block being further configured to output the trained neural model. In addition to any of the above features in this paragraph, the model updating block may be configured to iteratively update parameters of the neural model. In addition to any of the above features in this paragraph, the system may further comprise: a memory for storing said sampled plurality of contexts, said sample plurality of model outputs, and said estimated normalizations; wherein the stored estimated normalizations are associated with the sampled plurality of contexts and the sample plurality of model outputs in the memory. In addition to any of the above features in this paragraph, the model updating block may be configured to iteratively update parameters of the neural model updating block by: shuffling at least the stored estimated normalizations; and computing the loss gradient using the shuffled estimated normalizations. In addition to any of the above features in this paragraph, the trained neural model may comprise at least a portion of a sequence-to-sequence (seq2seq) model. In addition to any of the above features in this paragraph, the trained neural model may be trained to approximate a target conditional model that optimally reconciles a distance from the pre-trained conditional language model and the control objective on average across multiple contexts.

The foregoing description is merely illustrative in nature and is in no way intended to limit the disclosure, its application, or uses. The broad teachings of the disclosure may be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure may be implemented in and/or combined with features of any of the other embodiments, even if that combination is not explicitly described. In other words, the described embodiments are not mutually exclusive, and permutations of one or more embodiments with one another remain within the scope of this disclosure. All documents cited herein are hereby incorporated by reference in their entirety, without an admission that any of these documents constitute prior art.

Each module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module. Each module may be implemented using code. The term code, as used above, may include software, firmware, and/or microcode, and may refer to programs, routines, functions, classes, data structures, and/or objects.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The systems and methods described in this application may be partially or fully implemented by a special purpose computer created by configuring a general purpose computer to execute one or more particular functions embodied in computer programs. The functional blocks, flowchart components, and other elements described above serve as software specifications, which may be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

It will be appreciated that variations of the above-disclosed embodiments and other features and functions, or alternatives thereof, may be desirably combined into many other different systems or applications. Also, various presently unforeseen or unanticipated alternatives, modifications, variations, or improvements therein may be subsequently made by those skilled in the art which are also intended to be encompassed by the description above and the following claims.

The invention claimed is:

1. A method implemented by a processor for fine-tuning a pre-trained neural conditional language model to perform a downstream task, the method comprising:
   receiving the pre-trained conditional language model having attributes with existing probability distributions conditioned on contexts;
   receiving at least one target constraint for satisfying a task-related control objective associated with the downstream task, the target constraint specifying an expectation of a target attribute;

using the processor, training a neural model to approximate a target conditional model that reconciles a distance from the pre-trained conditional language model and the control objective across multiple contexts; and
   outputting the trained neural model representing the pre-trained neural conditional language model fine-tuned to perform the downstream task;
   wherein said training the neural model comprises:
   for each of one or more iterations:
      sampling contexts from a distribution of contexts;
      computing an unconditional energy-based model (EBM) for each sampled context using the pre-trained conditional language model and the target constraint; and
      updating the neural model over the sampled contexts using the computed unconditional EBMs.

2. The method of claim 1, wherein the trained neural model comprises one of a sequence-to-sequence (seq2seq) model, an encoder and a decoder.

3. The method of claim 1, wherein the trained neural model is trained to approximate a target conditional model that optimally reconciles a distance from the pre-trained conditional language model and the control objective on average across multiple contexts.

4. The method of claim 1, wherein the trained neural model comprises a sequence-to-sequence (seq2seq) model, and wherein said training the seq2seq model comprises:
   initializing a reference policy; and
   training the reference policy by stochastic gradient descent using a loss gradient that minimizes a distance from the pre-trained conditional language model and the control objective across multiple contexts to provide the trained neural seq2seq model.

5. The method of claim 4, wherein the loss gradient minimizes a distance from the pre-trained conditional language model and the control objective on average across multiple contexts to provide the trained neural seq2seq model.

6. The method of claim 4, wherein the loss gradient minimizes an expected cross-entropy CE between the reference policy and multiple target distributions $p_c$'s, where each target distribution $p_c$ is a normalization of an unconditional energy-based model (EBM) $P_c$ mapped by the target conditional model to a context c, and where the expected cross-entropy is over the distribution of contexts, the distribution of contexts being a distribution $\tau(c)$ of contexts c over a set of contexts C.

7. The method of claim 6, wherein the trained neural model comprises a sequence-to-sequence (seq2seq) model
   wherein said sampling contexts comprises sampling N contexts from the distribution $\tau(c)$ of contexts c;
   wherein said computing an unconditional energy-based model comprises computing the unconditional energy-based model (EBM) $P_c$ for each sampled context c over the distribution $\tau(c)$ of contexts c using the pre-trained conditional language model and the target constraint; and
   wherein said updating the neural model comprises updating the neural model over the N contexts by importance sampling using, for each context, M samples from the reference policy.

8. The method of claim 7, wherein the distribution $\tau(c)$ of contexts c is provided from a set of source documents.

9. The method of claim 7, wherein the N sample contexts are source documents from the set of contexts C.

10. The method of claim 9, wherein the source documents are provided from one or more of a dataset, an encoder encoding an input sequence, or a portion of the pretrained model.

11. The method of claim 6, wherein the unconditional EBM $P_c$ corresponds to the target distribution $p_c$; and
   wherein the target distribution $p_c$ is conditioned on the context c based on probabilities provided by the pre-trained conditional language model for the context a(x/c) and the target constraint for the context b(x/c).

12. The method of claim 11, wherein the target constraint is specified by a constraint satisfaction score that is combined with the probabilities provided by the pre-trained conditional language model for the context.

13. The method of claim 12, wherein the target constraint comprises one or more of a pointwise constraint, a binary constraint and a distributional constraint.

14. The method of claim 4,
   wherein said updating the neural model comprises:
   for each of N sampled contexts, sampling M samples x from the reference policy based on the context;
   estimating a normalization for the unconditional energy-based model (EBM) $P_c$ for each context c over the M samples using the computed unconditional EBM for the context; and
   updating parameters of the reference policy by applying the estimated normalization for each context-sample pair to the loss gradient;
   where M and N are hyperparameters.

15. The method of claim 14, wherein:
   the estimated normalization for each context-sample pair is stored in a buffer during each iteration; and
   said applying the estimated normalization for each context-sample pair to the loss gradient comprises:
      shuffling the buffer; and
      iterating over the shuffled buffer.

16. The method of claim 15, wherein said estimating a normalization comprises: computing a score for each sample x using the computed unconditional EBM for the context c; and
   computing the estimated normalization using the computed scores.

17. The method of claim 16, wherein the estimated normalization comprises a normalizing constant or partition function.

18. The method of claim 14, wherein said estimating a normalization further comprises:
   computing the estimated normalization over the M obtained samples by importance sampling; and/or
   reweighting the obtained samples by their likelihood according to the reference policy.

19. The method of claim 1, wherein the reference policy is initialized using the pre-trained conditional language model.

20. The method of claim 1, further comprising:
   determining if the reference policy has converged with the target conditional model; and
   ending the training if the reference policy has converged with the target conditional model.

21. The method of claim 1, wherein the downstream task is one of a summarization task, a code generation task, a dialogue task, and a translation task.

22. The method of claim 1, wherein the downstream task is a summarization task and the context is provided by processing a document to be summarized, and the constraint is based on factual correctness of the summarized document.

23. The method of claim 1, wherein the downstream task is a translation task and the context is provided by processing a document to be translated, and the constraint is based on consistency of terminology.

24. A method for generating text comprising:
   receiving a context by a trained neural language model trained according to the method of claim 1;
   the trained neural language model generating text in response to the received context.

25. A method for generating text comprising:
   receiving an input sequence;
   processing the input sequence to determine a context; and
   processing the context by a trained neural model trained according to the method of claim 1 to generate text in response to the context.

26. A non-transitory computer-readable medium having executable instructions stored thereon for causing a processor and a memory to implement a method for fine-tuning a pre-trained neural conditional language model to perform a downstream task, the method comprising:
   receiving the pre-trained conditional language model having attributes with existing probability distributions conditioned on contexts;
   receiving at least one target constraint for satisfying a task-related control objective associated with the downstream task, the target constraint specifying an expectation of a target attribute;
   training a neural model using the processor to approximate a target conditional model that reconciles a distance from the pre-trained conditional language model and the control objective across multiple contexts; and
   outputting the trained neural model;
   wherein said training the neural model comprises:
   for each of one or more iterations:
      sampling contexts from a distribution of contexts;
      computing an unconditional energy-based model (EBM) for each sampled context using the pre-trained conditional language model and the target constraint; and
      updating the neural model over the sampled contexts using the computed unconditional EBMs.

27. A processor-based system for fine-tuning a pre-trained neural conditional language model to perform a downstream task, comprising:
   an energy-based model (EBM) computing block configured to compute using one or more processors an energy-based model based on a received pre-trained conditional language model having attributes with existing probability distributions conditioned on contexts and at least one received target constraint for satisfying a task-related control objective, the target constraint specifying an expectation of a target attribute;
   a context sampling block configured to sample using one or more processors a plurality of contexts;
   a model output sampling block configured to sample using one or more processors a plurality of model outputs associated with each sampled context;
   a normalization estimating block configured to estimate using one or more processors a normalization based on said computed energy-based model and said sampled plurality of model outputs; and
   a model updating block for training a neural model using one or more processors to approximate using one or more processors a target conditional model that reconciles a distance from the pre-trained conditional language model and the control objective across multiple contexts based on a loss gradient determined using said estimated normalization; the model updating block being further configured to output the trained neural model.

28. The system of claim 27, wherein said model updating block is configured to iteratively update parameters of the neural model.

29. The system of claim 28, further comprising:
a memory for storing said sampled plurality of contexts, said sample plurality of model outputs, and said estimated normalizations;
wherein the stored estimated normalizations are associated with the sampled plurality of contexts and the sample plurality of model outputs in the memory.

30. The system of claim 29, wherein said model updating block is configured to iteratively update parameters of the neural model updating block by:
shuffling at least the stored estimated normalizations; and
computing the loss gradient using the shuffled estimated normalizations.

31. The system of claim 30, wherein the trained neural model comprises at least a portion of a sequence-to-sequence (seq2seq) model.

32. The system of claim 31, wherein the trained neural model is trained to approximate a target conditional model that optimally reconciles a distance from the pre-trained conditional language model and the control objective on average across multiple contexts.

*    *    *    *    *